(12) United States Patent
Hollick

(10) Patent No.: US 9,574,783 B2
(45) Date of Patent: *Feb. 21, 2017

(54) METHOD AND APPARATUS FOR TWO STAGE COOLING OF AMBIENT AIR

(75) Inventor: John C. Hollick, Ontario (CA)

(73) Assignee: HOLLICK SOLAR SYSTEMS LIMITED, King City (CA)

( * ) Notice: Subject to any disclaimer, the term of this patent is extended or adjusted under 35 U.S.C. 154(b) by 1219 days.

This patent is subject to a terminal disclaimer.

(21) Appl. No.: 13/361,063

(22) Filed: Jan. 30, 2012

(65) Prior Publication Data

US 2012/0186778 A1    Jul. 26, 2012

Related U.S. Application Data

(63) Continuation-in-part of application No. 11/436,432, filed on May 18, 2006, now Pat. No. 8,827,779.

(51) Int. Cl.
| | |
|---|---|
| F24F 7/00 | (2006.01) |
| F24F 5/00 | (2006.01) |
| F25B 23/00 | (2006.01) |
| F24J 2/04 | (2006.01) |

(52) U.S. Cl.
CPC ........... *F24F 5/0046* (2013.01); *F25B 23/003* (2013.01); *F24J 2/045* (2013.01); *Y02B 10/20* (2013.01)

(58) Field of Classification Search
CPC ..... F24F 5/0046; F25B 23/003; F25B 27/002; F25B 27/005
USPC ......................... 454/185, 186, 365
See application file for complete search history.

(56) References Cited

U.S. PATENT DOCUMENTS

| | | |
|---|---|---|
| 3,949,732 A | 4/1976 | Reines |
| 3,983,929 A | 10/1976 | Thomason et al. |
| 4,062,347 A | 12/1977 | Jensen |
| 4,207,868 A | 6/1980 | Peterson |
| 4,224,519 A | 9/1980 | Gammage et al. |

(Continued)

FOREIGN PATENT DOCUMENTS

| | | |
|---|---|---|
| AU | 2006201774 A1 | 11/2006 |
| DE | 3625454 | 1/1987 |

(Continued)

OTHER PUBLICATIONS

Translation of JP09061006A.*

(Continued)

*Primary Examiner* — Steven B McAllister
*Assistant Examiner* — Jonathan Cotov
(74) *Attorney, Agent, or Firm* — Perry + Currier Inc.

(57) ABSTRACT

An apparatus is provided comprising: a radiating panel mountable to a surface such that the panel is directed towards a night sky and cooled via radiation heat loss to the night sky, and air proximal the panel is cooled by transferring heat thereto which radiates the heat via the heat loss, the panel being sloped such that ambient air proximal an outer surface of the panel flows towards a lower portion of the panel as the ambient air cools, the ambient air being further cooled due to further contact with the panel as the ambient air flows towards the lower portion; a plurality of air openings in the lower portion of the panel, for the ambient air cooled by the panel to pass there through; and, an air collection space defined at least in part by the panel for receiving cooled ambient air passing through the air openings.

24 Claims, 23 Drawing Sheets

(56) References Cited

U.S. PATENT DOCUMENTS

| | | | |
|---|---|---|---|
| 4,244,519 A | 1/1981 | Zornig et al. | |
| 4,284,072 A | 8/1981 | McKaveney | |
| 4,295,415 A | 10/1981 | Schneider, Jr. | |
| 4,498,526 A | 2/1985 | Arenas | |
| 4,607,616 A | 8/1986 | Lehmann | |
| 4,774,932 A | 10/1988 | Hollick | |
| 4,899,728 A | 2/1990 | Peter et al. | |
| 4,934,338 A | 6/1990 | Hollick et al. | |
| 4,967,729 A | 11/1990 | Okumura | |
| 5,549,513 A * | 8/1996 | Thomas et al. | 454/365 |
| 6,357,512 B1 * | 3/2002 | Baer | A01K 1/0076 126/621 |
| 6,780,099 B1 | 8/2004 | Harper | |
| 6,903,261 B2 | 6/2005 | Habraken et al. | |
| 6,978,826 B2 | 12/2005 | Matsubara | |
| 7,866,176 B2 * | 1/2011 | Vetrovec | B01D 5/0066 202/234 |
| 2002/0117166 A1 | 8/2002 | Okumura | |
| 2004/0216410 A1 | 11/2004 | Shatzky | |
| 2005/0252507 A1 | 11/2005 | Hollick | |
| 2007/0130850 A1 | 6/2007 | Miekka | |

FOREIGN PATENT DOCUMENTS

| | | | |
|---|---|---|---|
| DE | 29800260 | | 2/1999 |
| DE | 19840362 | | 3/2000 |
| DE | 100 39 556 A1 | | 2/2002 |
| DE | 10039556 | | 2/2002 |
| GB | 1 441 456 | | 6/1976 |
| JP | U 1993-000803 | | 1/1993 |
| JP | 08338663 A | * | 12/1996 |
| JP | 09-061006 | | 3/1997 |
| JP | 9061006 | | 3/1997 |
| JP | 09061006 A | * | 3/1997 |
| JP | 9-235845 | | 9/1997 |
| JP | 10-140686 | | 5/1998 |
| JP | 10140686 | | 5/1998 |
| JP | 11-336210 | | 12/1999 |
| JP | 11336210 | | 12/1999 |
| JP | 2002-88994 | | 3/2002 |
| WO | WO-03/080956 A1 | | 10/2003 |
| WO | 2007134423 | | 11/2007 |

OTHER PUBLICATIONS

An English translation of a Japanese Office Action dated Jan. 17, 2012 received in connection with corresponding Japanese Application No. 2009-510239 (3 pgs.).

Excerpt entitled "Cooling by Nocturnal Radiation and Evaporation", ASHRAE from pages marked "33.17" of 2007 Handbook—Heating, Ventilating, and Air-Conditioning, SI Edition by the American Society of Heating, Refrigerating and Air-Conditioning Engineers, Inc., of Atlanta, Georgia.

Bernard Haurwitz, "Nocturnal Radiation and the Cooling of the Surface Layers", *Dynamic Meterology*, McGraw-Hill Book Company of New York, New York, 1941, p. 106.

Daniel S. Parker, "Theoretical Evaluation of the NightCool Nocturnal Radiation Cooling Concept", Submitted to: U.S. Department of Energy. FSEC-CR-1502-05. Apr. 2005, available at http://www.baihp.org/PUBS/nightcool/index.htm.

Re-Examination Report dated Oct. 6, 2016 for Australian Patent Application No. 2007252238.

* cited by examiner

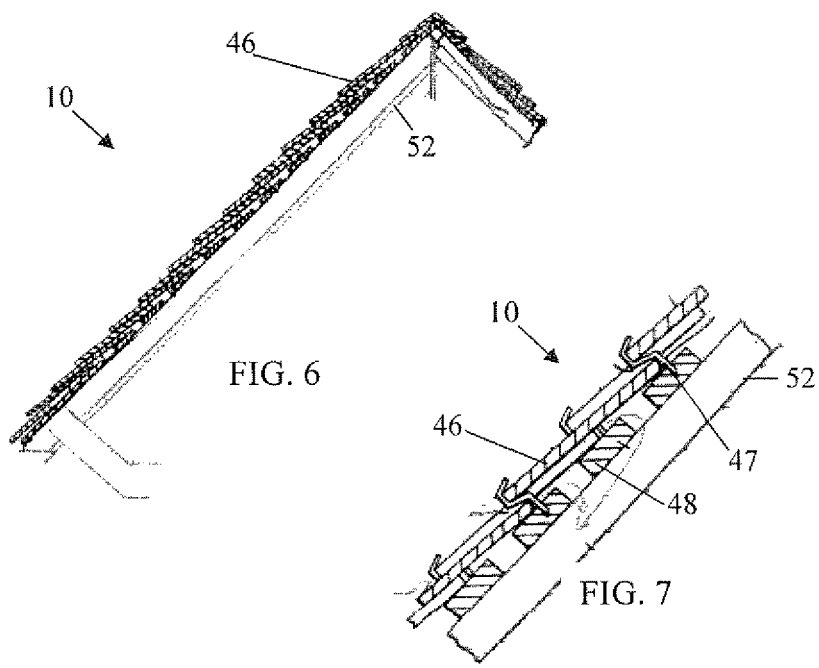
FIG. 6
FIG. 7
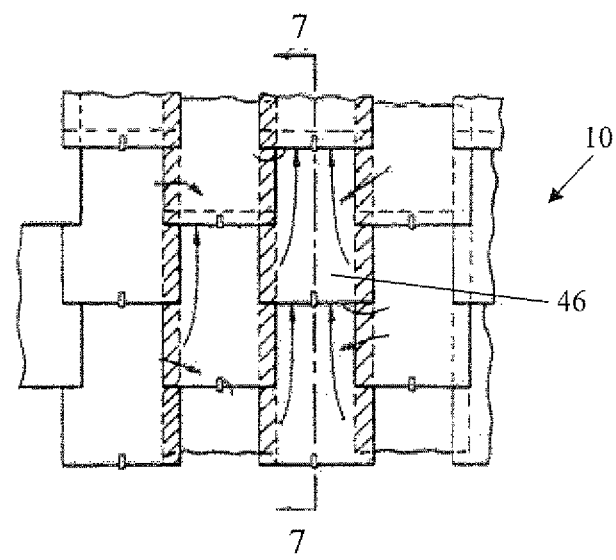
FIG. 8

METHOD AND APPARATUS FOR TWO STAGE COOLING OF AMBIENT AIR

CROSS-REFERENCE TO RELATED APPLICATIONS

This application is a continuation-in-part of U.S. patent application Ser. No. 11/436,432, filed May 18, 2006 now U.S. Pat. No. 8,827,779, the subject matter of which is incorporated herein by reference.

FIELD OF THE INVENTION

The present invention relates to the provision of ventilation air for buildings and to cooling of the ventilation air prior to introduction into a building.

BACKGROUND OF THE INVENTION

Commercial, industrial, domestic and apartment buildings require ventilation. It is common for natural leakage around doors, wall-ceiling joints, etc. found in standard building construction to allow sufficient air to enter the building. A pressure drop from the exterior to the interior of the building can arise from many factors, such as high winds, exhaust fans and combustion air for fuel-burning furnaces. This tends to draw outside air into the building through cracks or openings.

The conventional approach to providing ventilation by simply allowing air flow through leaks around doors and joints suffers from the disadvantages that the amount and the temperature of ventilation air is not controlled. This lack of control of ventilation air is typically made up for by providing additional heat during the heating season or by providing additional cooling by way of air conditioning and fans during the warm season or in hot climates.

U.S. Pat. Nos. 4,899,728 and 4,934,338 issued Feb. 13, 1990 and Jun. 19, 1990, respectively, disclose the use of a solar panel to heat fresh make-up (ventilation) air prior to introduction into a building. These systems are efficient for heating large volumes of air per surface area of solar panel. The systems described in these patents, however, address only heating of ventilation air and fail to address cooling which is desirable during the warm season or in hot climates.

SUMMARY OF THE INVENTION

An aspect of the specification provides an apparatus comprising: a radiating panel mountable to one or more of a surface and a building such that the radiating panel is directed towards a night sky and cooled due to radiation heat loss from the radiating panel to the night sky, and air proximal to the radiating panel is cooled by transferring heat to the radiating panel which radiates the heat via the radiation heat loss, the radiating panel being sloped such that ambient air proximal an outer surface of the radiating panel flows along the outer surface towards a lower portion of the radiating panel as the ambient air cools, the ambient air being further cooled due to further contact with the radiating panel as the ambient air flows towards the lower portion; a plurality of air openings in the lower portion of the radiating panel, for the ambient air cooled by the radiating panel to pass there through; and, an air collection space defined at least in part by the radiating panel for receiving cooled ambient air passing through the plurality of air openings, the air collection space connectable to a passageway for drawing the cooled ambient air for use in a cooling procedure.

The air collection space can be disposed between the radiating panel and one or more of the surface and the building.

The apparatus can further comprise a bottom panel wherein the air collection space is disposed between the radiating panel and the bottom panel.

The air collection space can be defined by the lower portion but not an upper portion of the radiating panel.

The radiating panel can comprise at least one of overlapping radiating panels and adjacent radiating panels. The plurality of air openings can comprise at least one of slits, holes, and gaps between at least one of the overlapping radiating panels and the adjacent radiating panels.

The radiating panel can comprise a plurality of photovoltaic panels for producing electricity.

The radiating panel can be corrugated.

An upper portion of the radiating panel can be enabled to facilitate flow of the ambient air towards the plurality of air openings in the lower portion. The upper portion can be generally smooth. The upper portion can comprise at least one of grooves and fins to facilitate cooling of the ambient air.

The lower portion can comprise a lower half of the radiating panel.

At least a section of an upper portion of the radiating panel can comprise one or more of the surface and the building when the apparatus is mounted thereto.

The plurality of air openings can be arranged in groups in the radiating panel and the ambient air cooled by the radiating panel above each respective group can flow towards each respective group. The groups can be arranged in one of a regular pattern or a random pattern in the radiating panel.

The air collection space can be connectable to the passageway at a lower portion of the air collection space.

The air collection space can be connectable to the passageway between a lower end and a midpoint of the air collection space.

A section of radiating panel above the passageway can be free of the air openings, thereby shielding the passageway from moisture coming through the air openings.

The air collection space can be connectable to the passageway along a side of the apparatus.

Aslope of the radiating panel can be in a range of approximately less than 5° to approximately more than 80°.

The apparatus can further comprise a mounting device to mount the radiating panel to at least one of the surface and the building.

The apparatus can further comprise a supporting device for supporting the radiating panel on at least one of the surface and the building.

At least a section of an upper portion of the radiating panel can be at least partially transparent and the lower portion can be opaque.

The apparatus can further comprise a drain at a lower end of the apparatus such that moisture that collects inside the radiating panel can drain.

A slope of an upper portion of the radiating panel can be different from a slope of the lower portion.

BRIEF DESCRIPTION OF THE DRAWINGS

The present invention will be better understood with reference to the following drawings and to the description, in which:

FIG. 6 is a sectional side view of an apparatus for cooling ventilation air for a building according to another embodiment of the present invention.

FIG. 7 is a partial sectional side view of the apparatus of FIG. 6, drawn to a larger scale.

FIG. 8 is a partial top view of the apparatus of FIG. 6, drawn to a larger scale.

DETAILED DESCRIPTION OF THE PREFERRED EMBODIMENT

The Stefan-Boltzmann Law of Radiation provides a calculation of heat loss from a warm surface to a colder surface. Roofs of buildings exposed to the clear night sky experience a temperature drop below that of ambient air temperature due to radiation heat loss from the roof to the cool night sky. The cooling rate in a clear, dry climate is approximately 75 W/m$^2$ of roof. The cooling rate reduces with higher humidity and cloud cover. The night cooling effect begins when the heat loss exceeds the solar heat gain, typically beginning prior to dusk and lasting until after dawn. Thus, approximately 10 to 12 hours of potential cooling to the night sky, exists each day.

Figure 1:
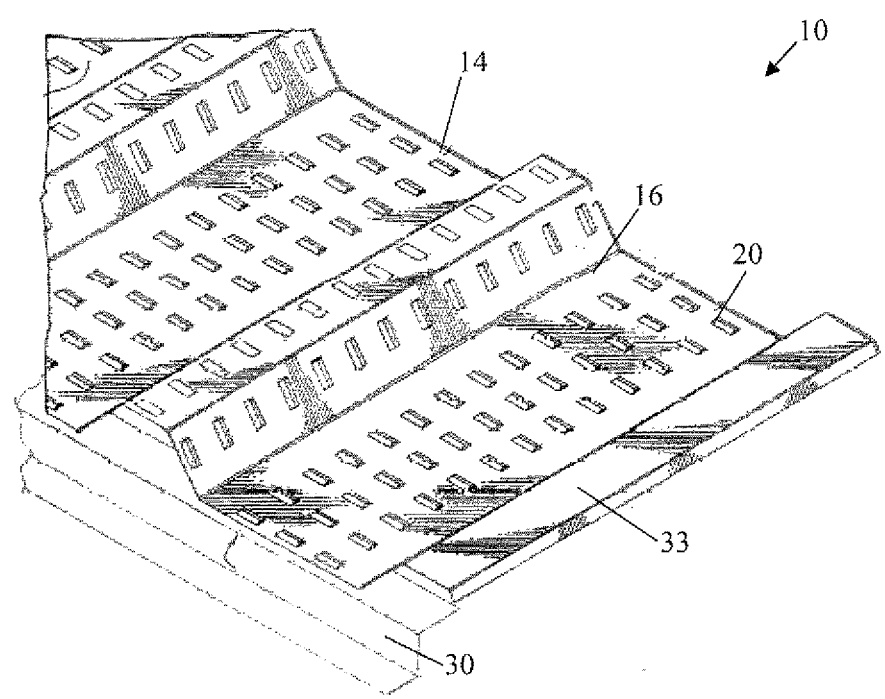
FIG. 1 is a perspective view of a portion of an apparatus for cooling ventilation air for a building according to one embodiment of the present invention.
Figure 2:
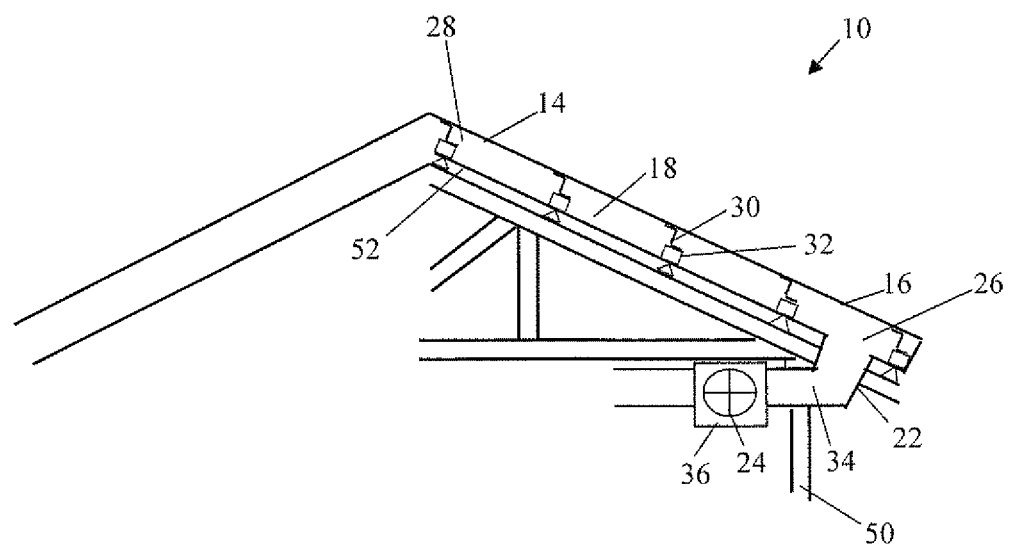
FIG. 2 is a sectional view of the apparatus of FIG. 1.

Reference is made to FIGS. 1 and 2 to describe an apparatus for cooling ventilation air for a building. The apparatus is indicated generally by the numeral 10 and the building is indicated generally by the numeral 50. The apparatus 10 includes a radiating panel 14 having an emissive surface 16 for use on the building 50 such that the emissive surface 16 of the panel 14 is directed skyward and exposed to ambient air. The radiating panel 14 defines an air collection space 18 between itself and the building 50 and has a plurality of air inlet openings 20 for the ambient air to pass through the openings 20 to the air collection space 18. A passageway 22 extends between the air collection space 18 and an interior of the building 50 and is located for passage of cooled ambient air from the air collection space 18 into the interior of the building 50. A fan 24 is located for moving the cooled ambient air from the air collection space 18 through the passageway 22 to the interior of the building 50.

One embodiment of the apparatus 10 for cooling ventilation air for a building 50 will now be further described with continued reference to FIGS. 1 and 2. The apparatus 10 is shown fixed to a roof 52 of the building 50. As shown, the radiating panel 14, referred to herein as the panel 14, is a corrugated metal panel with a highly emissive or radiating surface 16 and an opposing surface 17 with low absorption and emissivity. Thus, one surface has a higher emissivity rate than the other surface. The panel 14 is fixed to the outer surface of the roof 52 with the highly emissive surface 16 facing skyward and the less emissive surface 17 (also referred to herein as the downward facing surface 17) facing the roof 52 of the building 50. The roof 52 in the present embodiment is angled downwardly from an apex near the center of the roof 52 toward the outer edge and portions of the corrugated panel 14 extend generally parallel with the roof 52. Thus, the panel 14 includes a lower portion 26 proximal the outer edge of the roof 52 and an upper portion 28 proximal the apex of the roof 52. In the present embodiment, the panel 14 covers the majority of the roof 50 to provide shade to the roof 50.

The panel 14 is fixed to the outer surface of the roof 52 by intermediary Z-section bars 30 mounted on hat clips 32. Referring to FIG. 2, the hat clips 32 are secured to the outer surface of the roof 52 using suitable fasteners. The clips 32 are located in horizontal rows and are spaced apart so as to permit air flow between the clips. The Z-section of each of the bars 30 is shown in FIG. 2. As shown, these bars 30 are fixed to the clips 32 and to the panel 14 such that the central web portion of the Z-section bars further spaces the panel 14 from the roof 52. Thus, one edge of the Z-section bar is seated against the spaced apart clips 32, while the other edge of the bar is seated against the panel 14.

As indicated above, the panel 14 includes the air inlet openings 20 distributed throughout the surface of the panel 14. The air inlet openings 20 provide a travel path for ambient air to enter the air collection space 18 from the exterior. In the present embodiment, the air inlet openings 20 are distributed generally uniformly over the surface of the panel 14 with the exception of the immediate surrounding area where the passageway 22 meets the air collection space 18. The air inlet openings are formed by rotary punching slits in the panel 14 such that gaps at the end of the slits provide the air inlet openings 20. The air inlet openings 20 are small to aid in filtering air prior to entry into the apparatus for cooling ventilation air.

The perimeter of the panel 14 is closed off by a metal frame 33 that surrounds the panel 14. The metal frame 33 is sealed to the roof 52 around the sides and the top of the panel 14, using, for example, silicon caulking. The bottom of the metal frame is not sealed so as to allow rain or moisture to run off of the roof 52.

An air duct 34 is in communication with the air collection space 18, extending from a lower portion of the air collection space 18 (at a lower portion of the sloped roof 52), passing through an exterior wall of the building 50, and providing the passageway 22 for cooled ambient air from the air collection space 18 to enter the interior of the building 50. The air duct 34 extends into the building 50 to provide cooled outside air to the interior of the building 50, through openings in the air duct 34.

A fan housing 36 is connected along the air duct 34 and includes the fan 24 for moving air from the air collection space 18 into the interior of the building. In the present embodiment, the fan housing 36 is located on the roof 52, exterior to the building 50. Motorized dampers in the fan housing 36 are adjustable to allow air from the interior of the building to be mixed with cooled air from the air collection space 18. The fan 24 is typically sized to meet ventilation requirements and to inhibit negative air pressure within the building. A positive air pressure can be achieved by introducing the cooled air into the building through the air duct 34. Interior air leaves the building through openings and cracks. In the present embodiment, the fan 24 is a variable speed fan that is controlled by a controller dependent on the temperature of the incoming air. Thus, when the incoming air is above room temperature, the fan 24 runs at low speed. When the temperature of the incoming air is below room temperature, the fan speed increases to provide both ventilation air and cooling.

In use, the apparatus 10 for cooling ventilation air is located on the roof 52 of the building 50. Ambient air enters the air collection space 18 through the air inlet openings 20 in the panel 14, where the air is cooled. As the air in the air collection space 18 cools, warm air in the air collection space 18 rises while the cool air in the air collection 18 space falls. Thus, the coolest air in the air collection space 18 naturally falls toward the lower portion of the air collection space 18, where the air is withdrawn from the air collection space 18 by the fan 24, through the passageway 22 provided by the air duct 34 and into the building 50, thereby providing cooled ventilation air to the building 50.

As cooling of the air occurs in the air collection space 18, any water droplets that form on the downward facing surface of the panel 14, pulled downwardly by the force of gravity and thus travel down the slope of the panel 14. Travel of the water is interrupted by the Z-section bars 30 extending generally horizontally and fixed to the downward facing surface 17 of the panel 14. When the water meets the Z-section bar, the water drops off the panel 14 and down to the roof 52 of the building 50, where the water can then run off. Thus, some of the water that condenses on the downward facing surface 17 of the panel 14 runs off leaving less water to cool down. Further, during the daytime, the sun aids in drying the air collection space.

Figure 3:
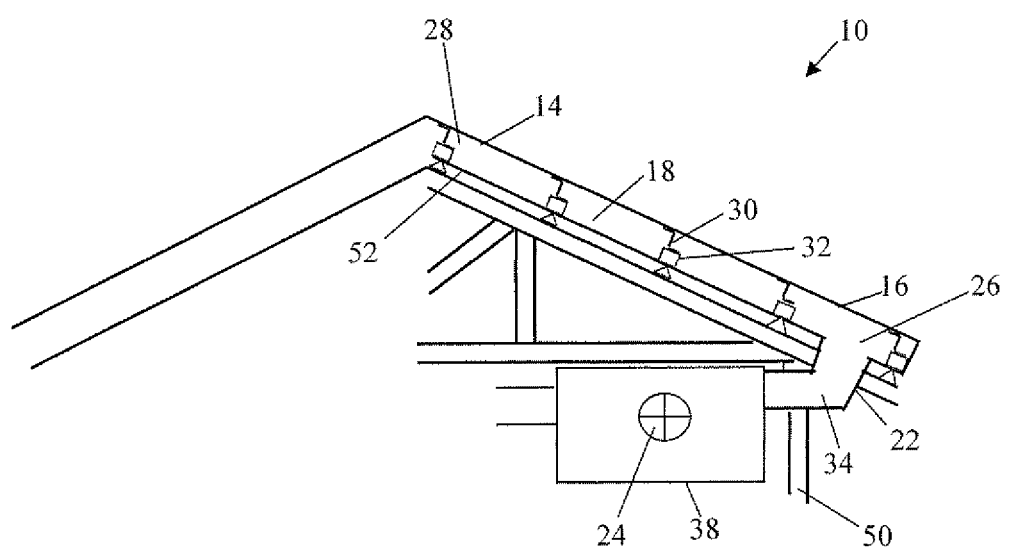
FIG. 3 is a sectional view of an apparatus for cooling ventilation air for a building according to another embodiment of the present invention.

Reference is now made to FIG. 3 to describe another embodiment. The present embodiment is similar to the first described embodiment and therefore is not described again in detail. Unlike the first embodiment, however, a cooling unit 38 in the form of an air conditioner is provided and the fan 24 is located within the cooling unit. Cooled air that is withdrawn from the air collection space 18 and into the air duct 34 is passed to the cooling unit for further cooling before being introduced to mix with air in the interior of the building, thereby providing further cooling. The cooling unit 38 also includes a dehumidifier for removing some of the moisture from the air entering the building. The dehumidifier is useful in humid climates.

Figure 4:
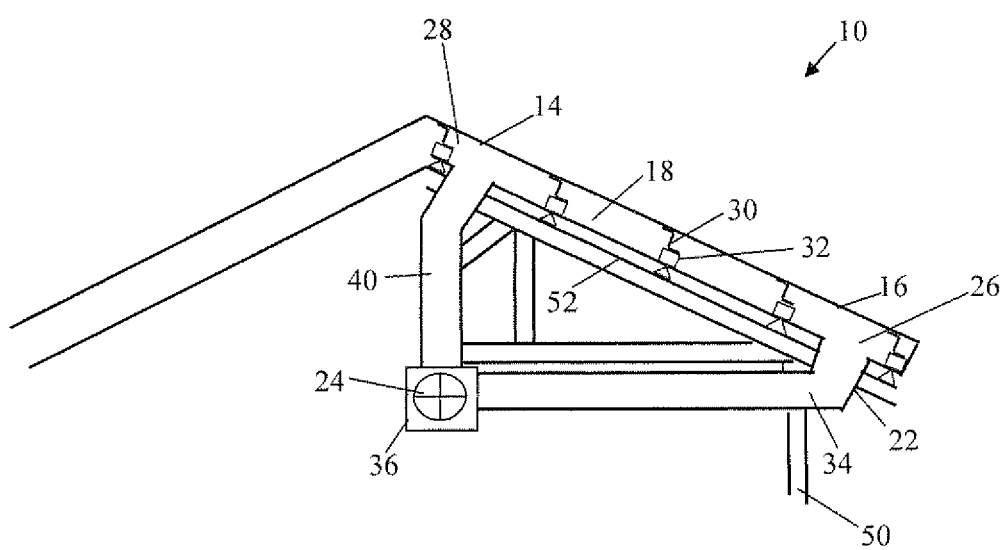
FIG. 4 is a sectional view of an apparatus for cooling ventilation air for a building according to still another embodiment of the present invention.

Reference is now made to FIG. 4 to describe yet another embodiment. Again the present embodiment includes many similar features to the first described embodiment and therefore further description of these features is not necessary. In the present embodiment, the emissive surface 16 of the panel 14 is coated with a medium colored paint (between dark and white) to provide a heat absorbent surface. The panel 14 therefore acts as to heat the air in the air collection space 18 during the daylight hours.

A second air duct 40 is in communication with the air collection space 18, extending from an upper portion of the air collection space 18 (at an upper portion of the sloped roof 52), to the fan 24, and providing a second passageway, this second passageway for heated ambient air from the air collection space 18 to enter the interior of the building 50. The first and second air ducts 34, 40 include dampers to direct air flow to the fan and into the building 50. Thus, air is selectively drawn from the air collection space 18 depending on time of day or heating or cooling needs.

In use, the apparatus 10 of the present embodiment is used for cooling ventilation air during the cooling (or summer) months. The apparatus 10 of the present embodiment, however, is also used during the heating (or winter) months for heating ventilation. The air in the air collection space 18 is heated by a combination of solar heat transmitted by conduction through the panel 14 and by heat escaping from the inside of the building 50, through the roof 52. As indicated above, warm air in the air collection space 18 rises while the cool air in the air collection 18 space falls. Thus, the second air duct 40 is located to remove air from the upper portion of the air collection space. The heated air is then withdrawn from the air collection space 18 through the second air duct 40 by the fan 24 and is introduced into the building 50. The use of the coating of heat absorbent paint permits daytime heating while still permitting night time cooling when the sun is not up.

The present invention has been described by way of examples. Modifications and variations to the above-described embodiments are possible. For example, while the first described embodiment refers to a uniform distribution of air inlet openings, air flow openings can be unevenly distributed, for example, by having fewer air flow openings at the lower portion of the panel, close to where the air duct 34 opens into the air collection space. Further, the density of air inlet openings can increase with distance from the air duct 34. Also, the size of the air inlet openings can increase with distance from the air duct 34. While the air duct 34 for providing cooled air to the building, is described as entering through a side wall of the building, it is also contemplated that this air duct can enter through the roof of the building.

While the apparatus for cooling ventilation air for a building has been shown and described on a sloped roof. The apparatus can also be used on a flat roof, as shown for example in FIG. 5 which shows radiating panels 14 with several air openings 20 to permit air flow into the air collection space defined by the radiating panel on the roof 52 of the building 50. In the present embodiment, the radiating panels 14 are sloped in relation to the roof 52 such that the air is drawn off into the passageway 22 at a lower level of the air collection space. Since hot air rises, hot air moves toward the uppermost part of the radiating panels 14 or out the openings 20. The cooler air falls toward the passageway 22 where it is drawn off when in use. As shown, there are no air openings at the point where the air duct 34 meets the air collection space. Also, in the present embodiment, the fan housing 36 (which includes the fan) is located on the roof 52.

Other alternatives are also possible. For example, the air inlet openings can be formed in any suitable manner. The openings can be in the form of slits as described, or holes or gaps between adjacent and overlapping roof tiles. Referring to FIGS. 6 to 8, a radiating panel 14 that is made up of overlapping roof tiles 46 is shown. In this embodiment, ventilation air passes through a gap under each tile, around the tile and then down between vertical supports 47 to which horizontal supports 48 are fixed. The horizontal supports 48 are fixed to the roof 52 of the building 50. It is also contemplated that the overlapping tiles that are used are photovoltaic panels for producing electricity during the day time.

It will also be appreciated that the heated air in the third-described embodiment can be further heated prior to mixing with air inside the building 50. It will also be appreciated that rather than using a single fan in the third described embodiment in which heating of ventilation air is provided, a second fan housing and second fan can be used for drawing air in. Also, the use of the hat clips and Z bars is described herein for exemplary purposes only. Other attachment means are contemplated. For example, on some roofs, vertical Z bars can be used rather than clips, for example, if a certain distance of the roof is to be spanned or if roof supports are not in line with a clip mounting position. The vertical bars are positioned to allow air to move horizontally towards the passageway. The vertical bar under the horizontal bar stops short of the lower roof line to allow air to move horizontally towards the fan inlet.

It will be appreciated that the size of the radiating surface of the panel and the flow rate controlled by the fan are related. For example, the flow rate can be determined based on the size of the radiating surface of the panel and the maximum cooling rate for air passing through the openings. Alternatively, the size of the panel can be determined based on the flow rate and the maximum cooling rate for air passing through the openings.

Figure 9:
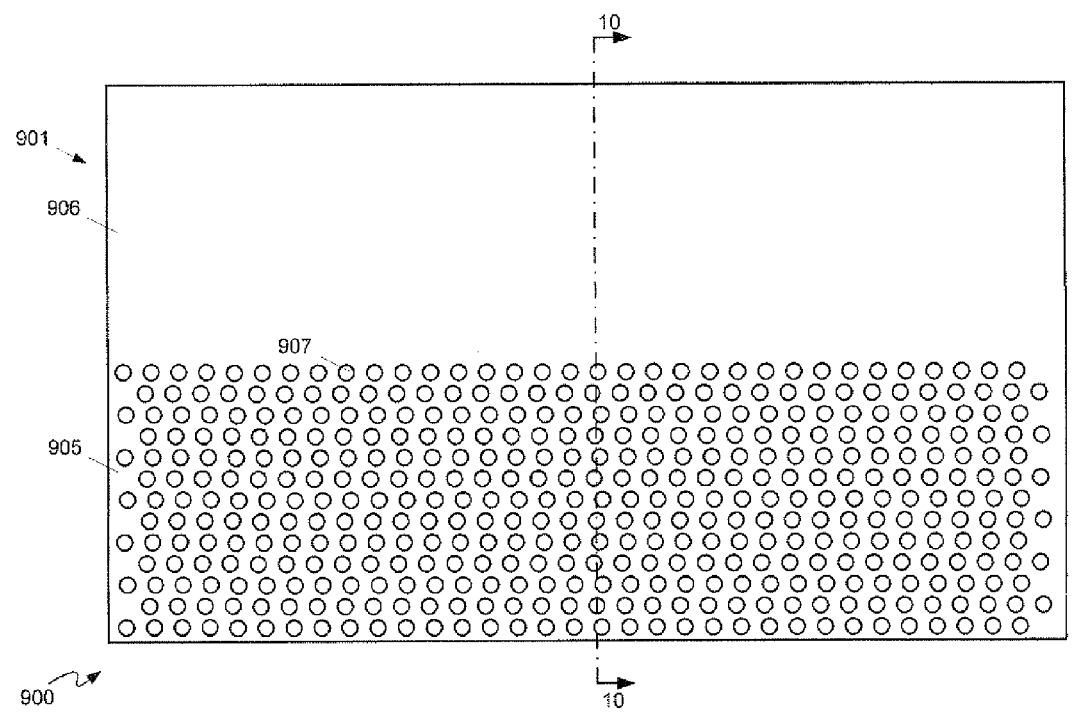
FIG. 9 depicts an apparatus for two stage cooling of ambient air, according to non-limiting implementations.
Figure 10:
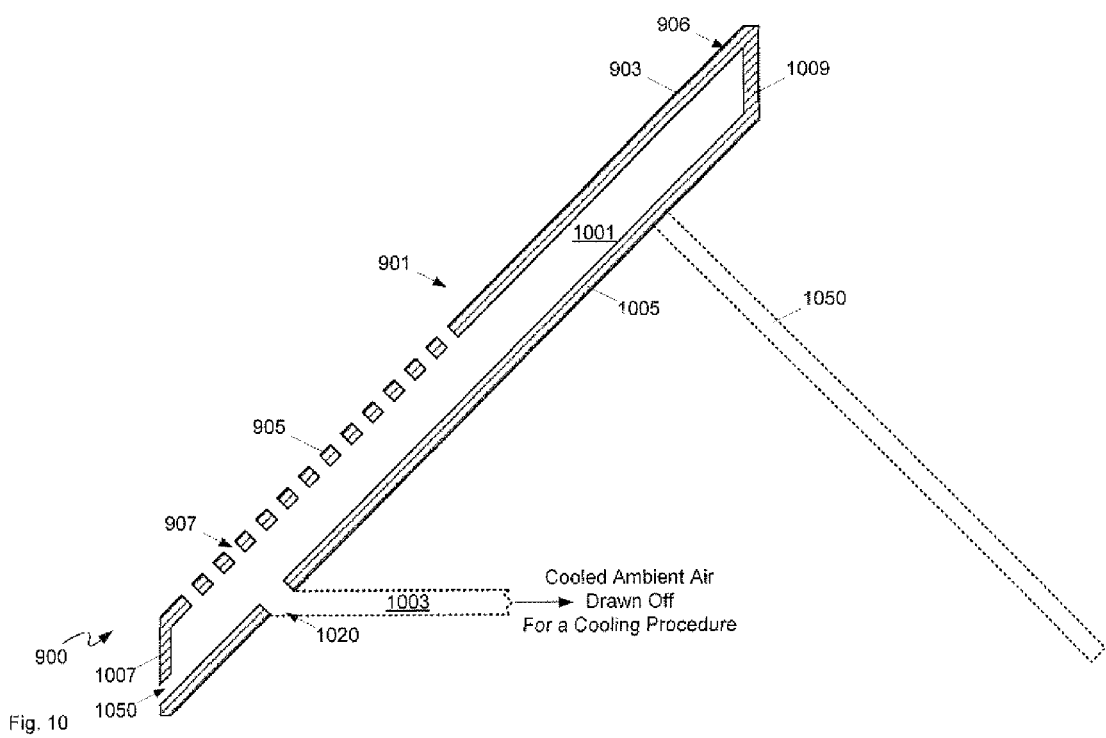
FIG. 10 depicts a cross-sectional view of the apparatus of FIG. 9 through line 10-10.

Attention is next directed to FIGS. 9 and 10 which depict a top view and a cross-section view, respectively, an apparatus 900 for two stage cooling of ambient air, according to non-limiting implementations. FIG. 10 depicts a cross-section through line 10-10 of FIG. 9. The cooled ambient air extracted from apparatus 900 can thereafter be used in any suitable system, including but not limited to ventilation systems, cooling systems, HVAC (heating, ventilation and air conditioning) systems, heat exchange systems and the like, for any suitable cooling procedure.

Apparatus 900 comprises a radiating panel 901, similar to radiating panel 14. However, it is appreciated that radiating panel 901 is mountable to one or more of a surface and a building such that the radiating panel is directed towards a night sky and cooled due to radiation heat loss from the radiating panel to the night sky, as described above. It is appreciated that radiating panel 901 need not be mounted on a roof of a building, but could be mounted on any suitable surface such that radiating panel 901 is directed skywards at night, as will be explained hereafter.

In any event, it is appreciated that radiating panel 901 is cooled at night due to night cooling, as explained previously, such that air proximal to radiating panel 901 is cooled by transferring heat to radiating panel 901 which radiates the heat via the radiation heat loss. In essence, the night sky acts a giant heat sink such that radiating panel 901 is cooled below ambient temperatures. Hence, air proximal radiating panel 901 is cooled below ambient temperatures as heat from the air is transferred to radiating panel 901 and radiated thereafter to the night sky.

It is further appreciated that radiating panel 901 is sloped such that ambient air proximal an outer surface 903 of radiating panel 901 flows along outer surface 903 towards a lower portion 905 of radiating panel 901 as the ambient air cools, the ambient air being further cooled due to further contact with radiating panel 901 as the ambient air flows towards lower portion 905. It is appreciated that radiating panel 901 also comprises an upper portion 906 above lower portion 905.

Apparatus 900 further comprises a plurality of air openings 907 in the lower portion 905 of radiating panel 901, for the ambient air cooled by radiating panel 901 to pass there through.

As depicted in FIG. 10, apparatus 900 further comprises an air collection space 1001. It is appreciated that collection space 1001 is defined at least in part by radiating panel 901, wherein air collection space 1001 receives cooled ambient air passing through the plurality of air openings 907. In turn, air collection space 1001 is connectable to a passageway 1003 for drawing the cooled ambient air for use in a cooling procedure. It is appreciated that passageway 1003 is not part of apparatus 900, but can be connected when apparatus 900 is installed. It is further appreciated that passageway 1003 can be connected to apparatus 900 in any suitable manner, and the method of connection is not to be considered particularly limiting.

In non-limiting implementations depicted in FIG. 10, apparatus 900 further comprises a bottom panel 1005 and air collection space 1001 is generally disposed between radiating panel 901 and bottom panel 1005. Air collection space 1001 is further defined by a lower end section 1007 and an upper end section 1009. While not depicted, it is further appreciated that apparatus 900 is further enclosed by a side section and an opposing side section (e.g. left and right side sections).

Further, it is generally appreciated that radiating panel 901, bottom panel 1005, lower end section 1007, upper end section 1009 and the side sections are connected using any suitable devices and/or processes, including but not limited to screws, bolts, welding and the like. Furthermore, apparatus 900 can be sealed so as to not allow rain and/or moisture therein, and to further prevent cooled air from leaking out of apparatus 900, other than through passageway 1003. For example any suitable caulking material, including but not limited to silicone caulking, can be used to seal radiating panel 901, bottom panel 1005, lower end section 1007, upper end section 1009, and the side sections.

In some implementations, as depicted, lower end section 1007 can comprise an optional moisture drain 1050, comprising an aperture in lower end section 1007, so that rain entering air collection space 1001, for example via air openings 907 and indeed any moisture that collects in air collection space 1001 (such as condensation) can drain via lower end section 1007. In some implementations, moisture drain 1050 can be connected to a draining apparatus (not depicted), such as a collection trough, a hose, a pipe and the like, to drain moisture to a downspout and the like.

Hence, in these implementations, apparatus 900 is enabled as a standalone apparatus that can be mounted on any suitable surface. In some implementations, apparatus 900 can comprise an optional supporting structure 1050 to support apparatus 900 at a suitable angle to one or more of a surface and a building. Supporting structure 1050 can include, but is not limited to, a brace. In other implementations, apparatus 900 can be mounted on a sloped surface of a suitable angle. In yet further implementations, apparatus 900 can further comprise a mounting device to mount radiating panel 901 to at least one of the surface and the building. Such a mounting device can include, but is not limited to, support structure 900, angle iron, screws, bolts, braces, frames, enclosed ducts, and the like.

Furthermore, as depicted in FIG. 10, passageway 1003 is connected to air collection space 1001 via an aperture 1020 in bottom panel 1005, and specifically located opposite lower portion 905. However, air collection space 1001 can be connectable to passageway 1003 at any suitable location, including, but not limited to, one of the side sections, for example similar to passageway 22 connected to apparatus 10 depicted in FIG. 5.

It is generally appreciated, however that air collection space 1001 is connectable to passageway 1003 at a lower portion of air collection space 1001, for example opposite lower portion and/or adjacent to lower portion 905. However, air collection space 1001 can be connectable to passageway 1003 at any suitable location, including but not limited to between a lower end and a midpoint of air collection space 1001, either along a back of apparatus 900, and/or along a side of apparatus 900. However, the location on apparatus 900 where passageway 1003 is connectable to air collection space 1001 is not to be considered particularly limiting, and indeed the location on apparatus 900 where passageway 1003 is connectable to air collection space 1001 can be at a front of apparatus 900 and/or between a lower end and an upper end of air collection space 1001.

Figure 23:
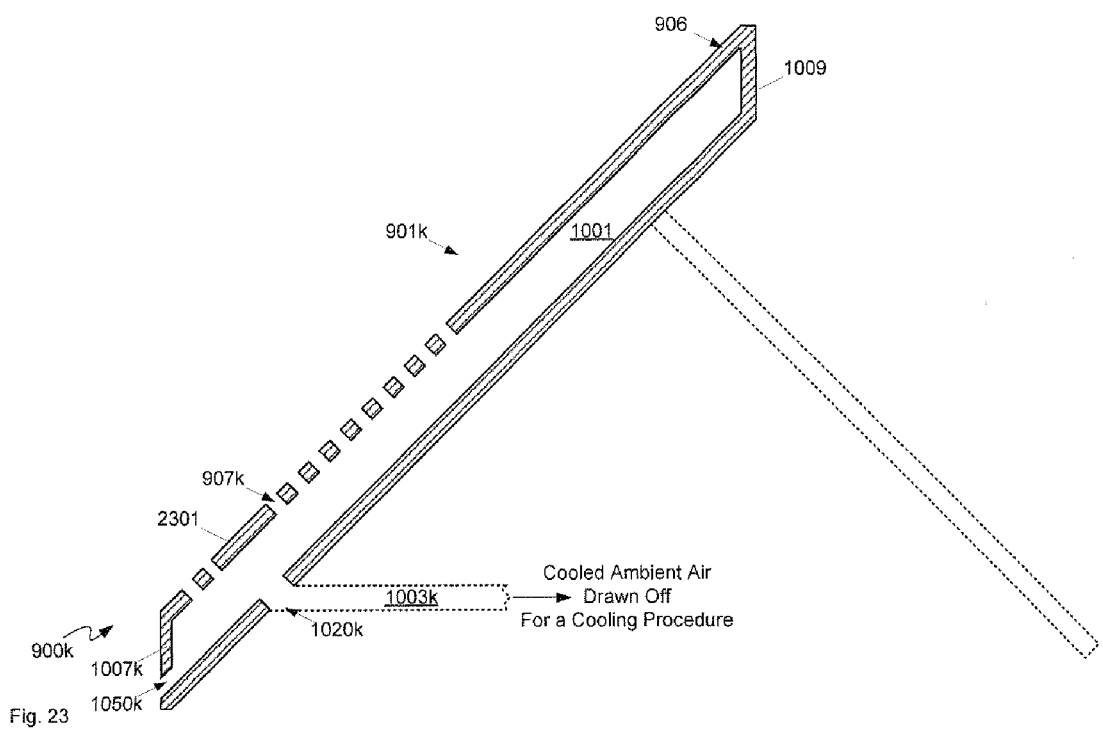
FIG. 23 depicts a cross-sectional view of an apparatus for two stage cooling of ambient air, according to non-limiting implementations.

In some implementations, a portion of radiating panel 901 immediately above aperture 1020 is free of air openings 907 to prevent rain, moisture and the like from entering passageway 1003 (i.e. rain and other ambient moisture is prevented from dropping from air openings 907 into aperture 1020 and/or passageway 1003). For example, attention is directed to FIG. 23, which depicts an apparatus 900k substantially similar to apparatus 900, with like elements having like numbers however with a "k" appended thereto. It is furthermore appreciated that not all elements of apparatus 900k are numbered in FIG. 23 for clarity. In any event, a portion 2301 of radiating panel 901k immediately above aperture 1020k is free of air openings 907k to prevent rain, moisture and the like from entering passageway 1003k. The geometric shape of portion 2301 is appreciated to be substantially non-limiting, and has any suitable dimensions that will prevent rain and the like from entering aperture 1020k. It is further appreciated that while portion 2301 is depicted in cross-section, portion 2301 does not necessarily extend the horizontal length of radiating panel 901k, but rather is localized to the area above aperture 1020k.

Figure 11:
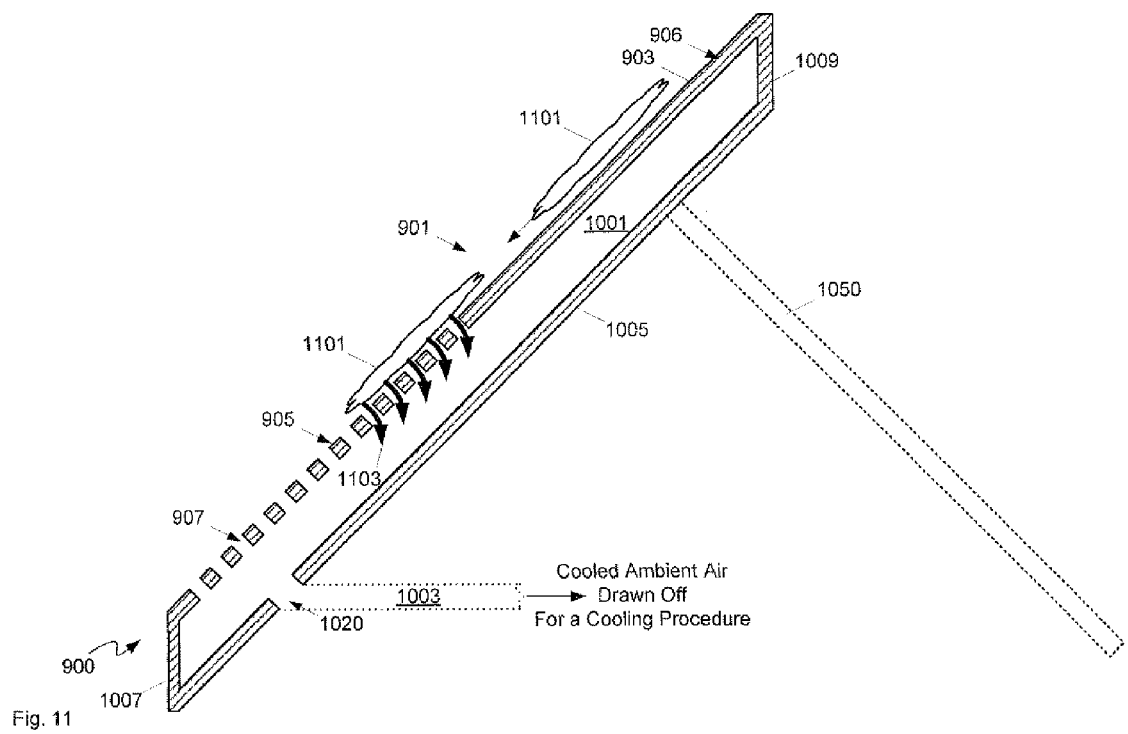
FIG. 11 depicts similar to FIG. 10, further depicting flow of air through the apparatus.

The functionality of apparatus 900 is explained hereafter in further detail, with reference to FIG. 11, which is substantially similar to FIG. 10, with like elements having like numbers. Ambient air 1101 proximal outer surface 903 of radiating panel 901 is cooled as heat from ambient air 1101 is transferred to radiating panel 901. As depicted, ambient air 1101 is located at upper portion 906. As ambient air 1101 is cooled, the density of ambient air 1101 changes, and specifically becomes denser with regards to the air above it. Hence, due to the slope of radiating panel 901, and the change in density, ambient air 1101 flows along outer surface 903 towards lower portion 905 of radiating panel 901 due to gravity as ambient air 1101 cools. As ambient air 1101 flows along outer surface 903, ambient air 1101 is further cooled due to further contact with radiating panel 901 as the ambient air flows towards the lower portion 905. As ambient air 1101 reaches air openings 907, being cooled as ambient air 1101 flows further down lower portion 905, ambient air 1101 is drawn through air openings 907 into air collection space 1001, for example due to one or more of a negative pressure induced in air collection space by a fan or similar apparatus located along passageway 1003 and gravity. The flow of ambient air 1101 into air collection space 1001 is represented by arrows 1103. It is appreciated that cooling of ambient air 1101 continues at lower portion 905, and hence, cooling of ambient air 1101 occurs in two stages: first along upper portion 906 and then along lower portion 905.

While FIG. 11 depicts ambient air 1101 initially along upper portion 906, it is appreciated that a layer of ambient air is located along the entire outer surface 903 of radiating panel 901, and that ambient air initially located along upper portion 906 undergoes two stage cooling, while air initially located along lower portion 905 undergoes single stage cooling, similar to radiating panel 14.

In any event, once ambient air 1101 is cooled, convection currents will form along outer surface 903, due to the cooling as well as any negative pressure in air collection space 1001.

It is also appreciated that cooling of air proximal to radiating panel 900 inside air collection space 1001 will also occur similar to radiating panel 14.

It is appreciated that a slope of radiating panel 901 can be of any suitable value, for example in a range of approximately 5° to approximately 80° with respect the ground, including but not limited to less than approximately 5° to more than approximately 80°. In some implementations, a slope of radiating panel 901 is approximately 30°, however any suitable angle of slope is within the scope of present implementations. It is further appreciated that in some implementations, radiating panel 901 can be mounted on a sloped roof, and hence the slope of radiating panel 901 is similar to the slope of a roof upon which radiating panel 901 is mounted. In some instances, roofs of larger buildings can have smaller slopes than roofs of smaller buildings, which tend to have steeper slopes/angles. While the terms smaller buildings and bigger buildings are appreciated to be relative, they are simply meant to illustrate that a wide range of slopes and/or angles are within the scope of present implementations and the angle of slope is not to be considered particularly limiting, and further that the slope of radiating panel 901 can be determined by the slope of the roof to which radiating panel 901 is mounted.

Figure 5:
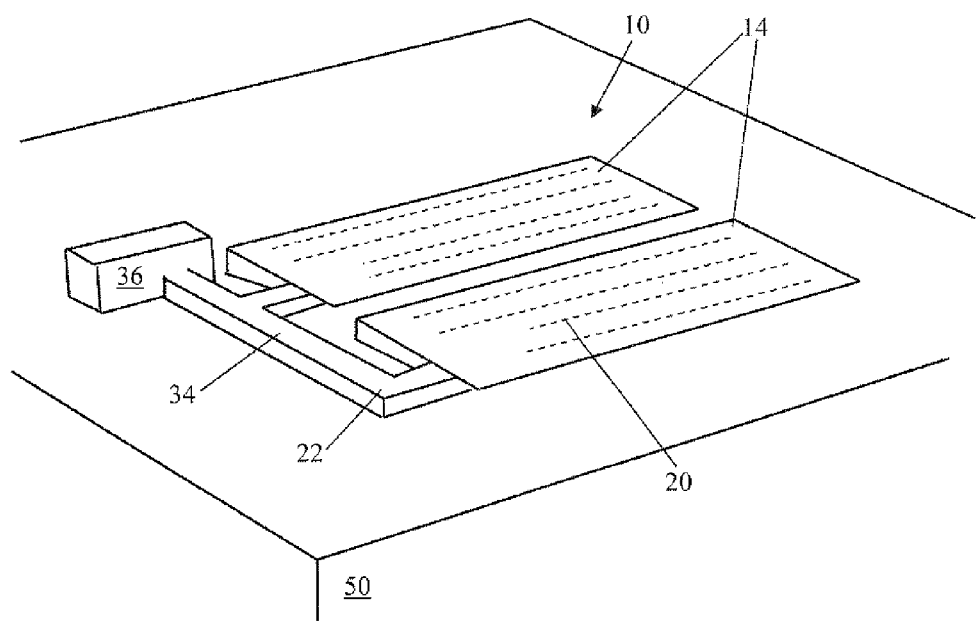
FIG. 5 is a perspective view of an apparatus for cooling ventilation air for a building according to yet another embodiment of the present invention.

It is further appreciated that dimensions of apparatus 900 can be of any suitable value. In some implementations, apparatus 900 can be generally enabled to cover at least a portion, or all of a building's roof or suitable surface adjacent to the cooling requirement. For example, radiating panel 901 can range from be less than approximately 50 square feet (e.g. approximately 5 square meters) to hundreds of thousands of square feet/square meters for a building with that roof area. In large installations, however, it is appreciated that a plurality of apparatus 900 and/or radiating panels 901 can be installed similar to apparatus 10 of FIG. 5 to cover large surface areas. Indeed, it is appreciated that one or more of apparatus 900 and/or radiating panels 901 can be modular similar to apparatus 10 of FIG. 5 provide flexibility during installations.

Figure 24:
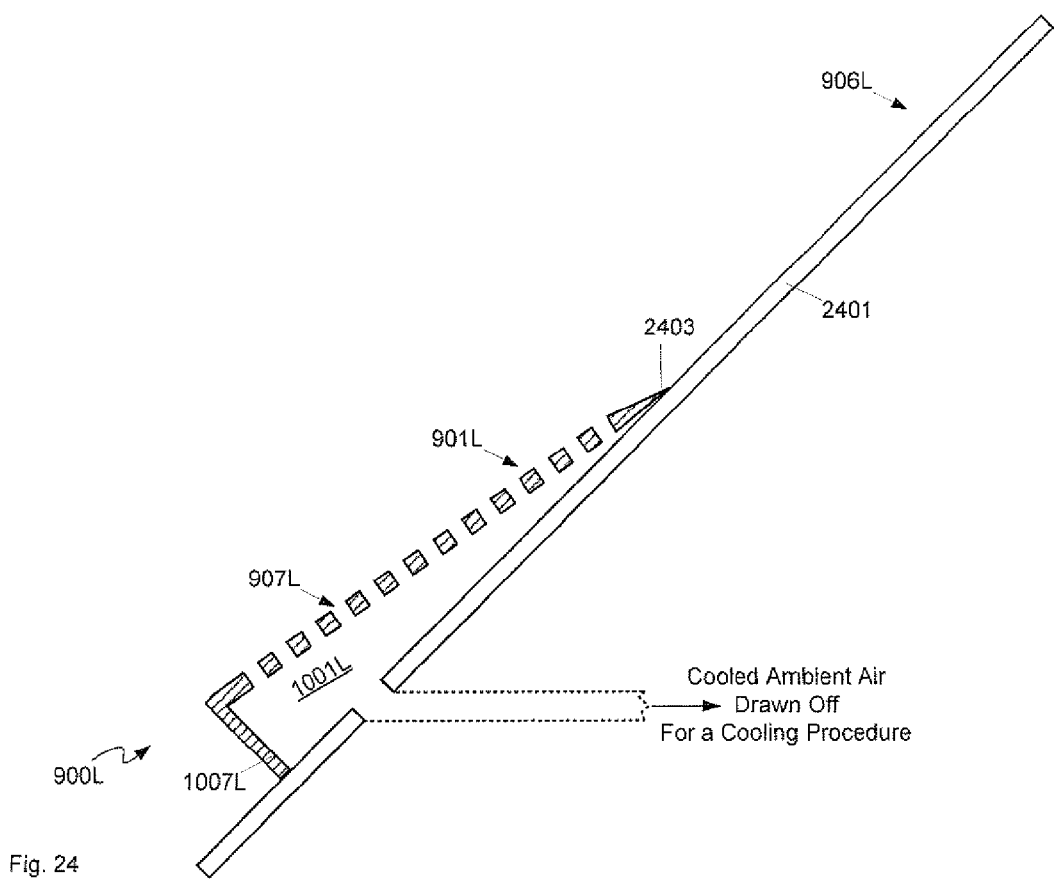
FIG. 24 depicts a cross-sectional view of an apparatus for two stage cooling of ambient air with at least a portion of air cooled by a sloped surface, according to non-limiting implementations.

It is further appreciated that a depth of air collection space 1001 can range from less than approximately 2 inches to more than approximately 15 inches, and further can be variable as depicted in FIG. 24.

The cumulative open area of air openings 907 (i.e. total area of the holes defined by air openings 907) can be generally proportional to the volume of air being cooled. In order to cool as much air as possible, air flow through each air opening 907 can be balanced by making each air opening 905 as small as possible, and spreading air openings 907 over as large a surface as possible. Testing of prototypes has shown that, when air openings 907 have a an open area that is too large relative to the air volume being cooled, then more air may enter air openings 907 closer to aperture 1020 and less air may enter air openings 907 further from aperture 1020, and indeed air further from aperture 1020 may not be drawn into passageway 1003. Testing of a successful prototype has shown that balanced air flow can be achieved when the cumulative open area of air opening 907 is below approximately two percent (2%) of the total surface area over which air openings 907 are distributed. Indeed, in testing the successful prototype, excellent results in balanced air flow were achieved when the cumulative open area of air opening 907 is between approximately one quarter percent (¼%) and approximately one percent (1%) of the total surface area over which air openings 907 are distributed. When the cumulative open area of air openings 907 is substantially above 2%, it can be challenging to balance air flow on large roofs. Furthermore, the degree of cooling energy available from radiating panel 901 at night is about one tenth of the radiating panel 901's solar energy heating capacity in the day; hence the volume of air intake is controlled such that volumes of air are much lower relative to similar solar heating systems (for example see Applicant's U.S. Pat. No. 4,899,728 to a solar heating system), with air openings 907 spread out over as much surface area as possible.

It is further appreciated that while air openings 907 are depicted as large circular apertures in FIGS. 10 and 11, air openings 907 can be of any suitable shape, size and configuration, including but not limited to rectangles (e.g. as in FIG. 1) slits, holes, gaps, and the like.

Indeed, the large circular apertures of air openings 907 in FIGS. 10 and 11 are appreciated to be of an exaggerated size in order to illustrate the functional aspects of present implementations. For example, attention is further directed to FIG. 25 which depicts a non-limiting example of a lower portion 2505 of a radiating panel 2501, with air openings 2507 comprising slits created at each side of dimples 2511. One of the dimples 2511 is depicted in magnified view for clarity. Dimples 2511 comprise raised and/or lowered sections of radiating panel 2501 (depending on which side is to be up) forming air openings 2507 in the form of slits on both sides running up and down radiating panel 2501. Hence, the open area of air openings 2507 can be modified during fabrication to suit the air volume for a given installation project, for example my making dimples 2511 deeper or shallower.

Figure 25:
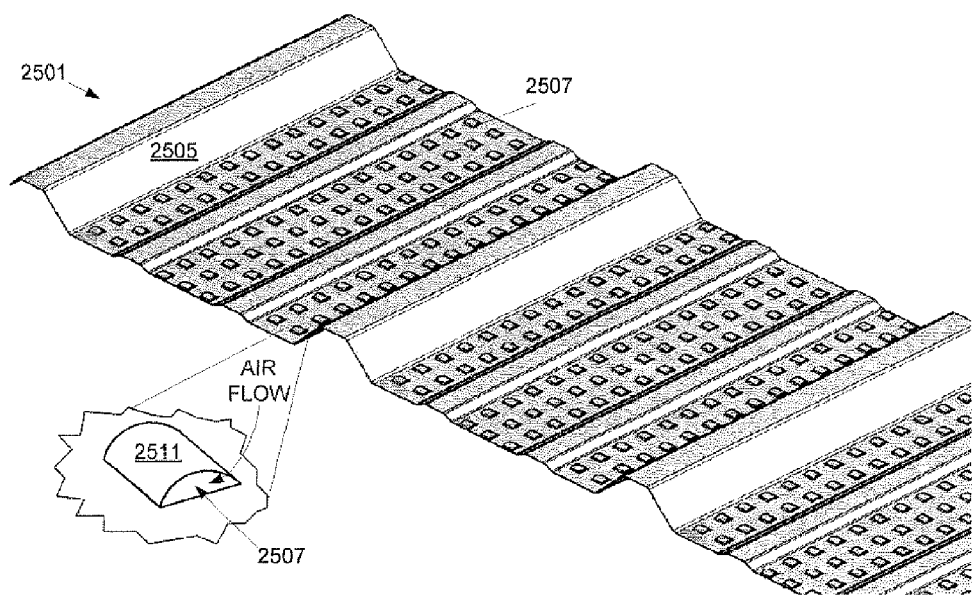
FIG. 25 depicts a radiating panel for forming a perforated section of the apparatus of any of FIGS. 1 to 24, with air openings formed by dimples, according to non-limiting implementations; one of the dimples is shown in a magnified view.

Further, while slits of air openings 2507 in FIG. 25 are appreciated to be parallel to a direction of air flow down radiating panel 2501, in other implementations such slits can be formed perpendicular to a direction of air flow, for example by rotating dimples 2511 by 90° at a time of fabrication, and/or by rotating radiating panel by 90° at the time of installation (taking into account the corrugation pattern of radiating panel 2501).

Hence, while FIGS. 10 and 11 (and subsequent figures described below) depict air openings 907 as exaggerated large circular apertures, it is appreciated that air openings 907 can be of any suitable shape and size, taking into account the desired rate and/or volume of air flow through radiating panel 901.

In some implementations, radiating panel 901 can comprise at least one of overlapping radiating panels and adjacent radiating panels, similar to implementations of radiating panel 14 depicted in FIGS. 6 to 8. Indeed, in these implementations, the plurality of air openings 907 can comprise at least one of slits, holes, and gaps between at least one of the overlapping radiating panels and the adjacent radiating panels. In other words, lower portion 905 comprises at least one of overlapping radiating panels and adjacent radiating panels which form the plurality of air openings 907. Upper portion 906 can comprise at least one of overlapping radiating panels and adjacent radiating panels which do not form air openings.

It is yet further appreciated that radiating panel 901 can be corrugated similar to radiating panel 14 as depicted in FIG. 1, as well as radiating panel 2501 of FIG. 25.

Furthermore, in other implementations, radiating panel 901 can comprise a plurality of photovoltaic panels for producing electricity. hence, for example, apparatus 900 can produce cooled ambient air at night, while in the daytime exposure to sunlight can cause the photovoltaic panels to produce electricity.

It is yet further appreciated that apparatus 900 can comprise any suitable material, or combination of materials, for example sheet metal, corrugated sheet metal and the like, including but not limited to tin, aluminum, steel, glazing, skylights and the like.

Figure 12:
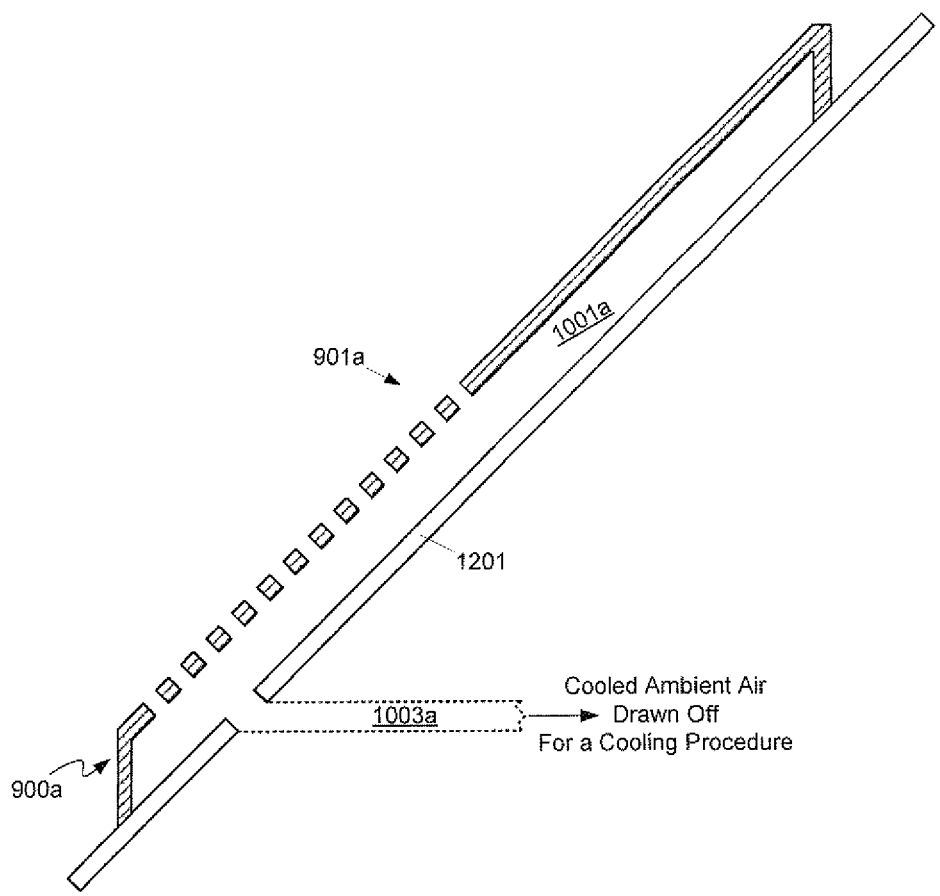
FIG. 12 depicts a cross-sectional view of an apparatus for two stage cooling of ambient air for mounting on a sloped roof, according to non-limiting implementations.

Attention is next directed to FIG. 12, which depicts an alternative implementation of an apparatus 900a for two stage cooling of ambient air. It is appreciated that apparatus 900a is substantially similar to apparatus 900, with like elements having like numbers however with an "a" appended thereto. It is furthermore appreciated that not all elements of apparatus 900a are numbered in FIG. 12 for clarity. In any event, air collection space 1001a is generally disposed between radiating panel 901a and a surface 1201, including, but not limited to, a roof of a building, or any other suitable surface. It is appreciated that, while not depicted apparatus 900a further comprises opposing side panels which further define air collection space 1001a. However, radiating panel 900a has no bottom panel, and air collection space 1001a is formed when radiating panel 900a is mounted on a suitable surface 1201. Passageway 1003a can be connected to air collection space 1001*a* via surface 1201. Alternatively, passageway 1003*a* can be connected to air collection space 1001*a* via apparatus 900*a*, for example in one or more of opposing side panels, as described above with reference to apparatus 900, such that an aperture need not be placed in surface 1201.

Figure 13:
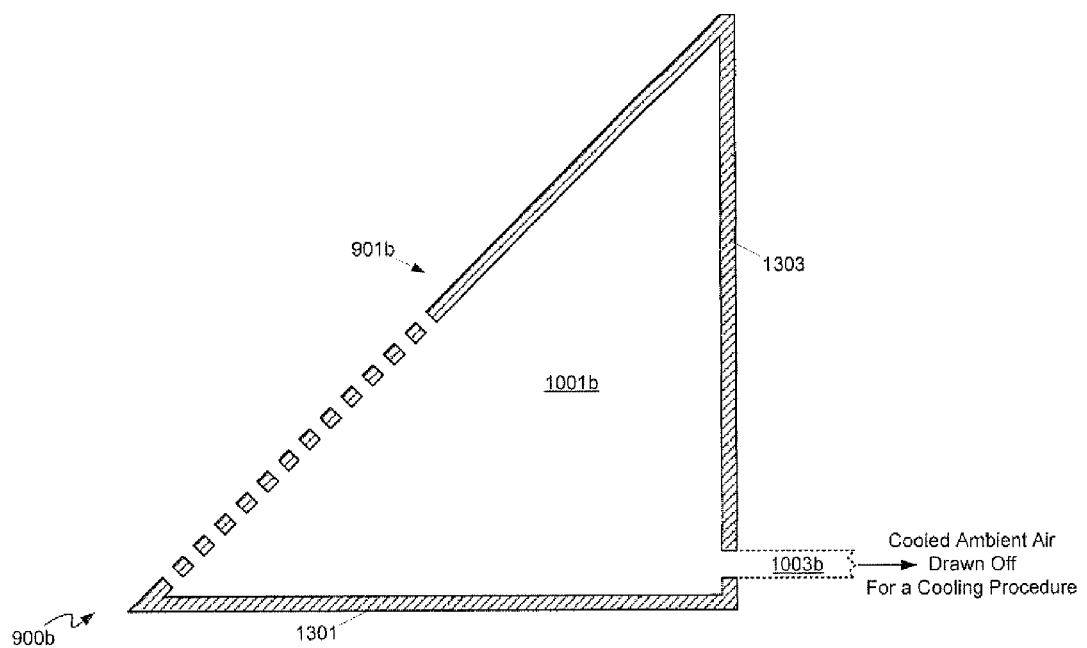
FIG. 13 depicts a cross-sectional view of an apparatus for two stage cooling of ambient air with a triangular cross-section, according to non-limiting implementations.

Attention is next directed to FIG. 13, which depicts an alternative implementation of an apparatus 900*b* for two stage cooling of ambient air. It is appreciated that apparatus 900*b* is substantially similar to apparatus 900, with like elements having like numbers however with a "b" appended thereto. It is furthermore appreciated that not all elements of apparatus 900*b* are numbered in FIG. 13 for clarity. In any event, air collection space 1001*b* is generally defined by radiating panel 901*b* a bottom panel 1301 and a back panel 1303, which form a triangular shape in cross section. It is appreciated that, while not depicted apparatus 900*b* further comprises opposing side panels which further define air collection space 1001*b*. In other words, apparatus 900*b* is self supporting and self-standing, and can be mounted to any suitable surface, including but not limited to a flat roof of a building, similar to apparatus 10 as depicted in FIG. 5.

Furthermore, in some implementations apparatus 900*b* can be without bottom panel 1301. In other words, apparatus 900*b* could be mounted on a flat surface, similar to apparatus 10 of FIG. 5 with a bottom of air collection space 100*b* defined by the flat surface.

Apparatus 900*b*, with or without bottom panel 1301, can further be modular similar to apparatus 10 of FIG. 5.

Figure 14:
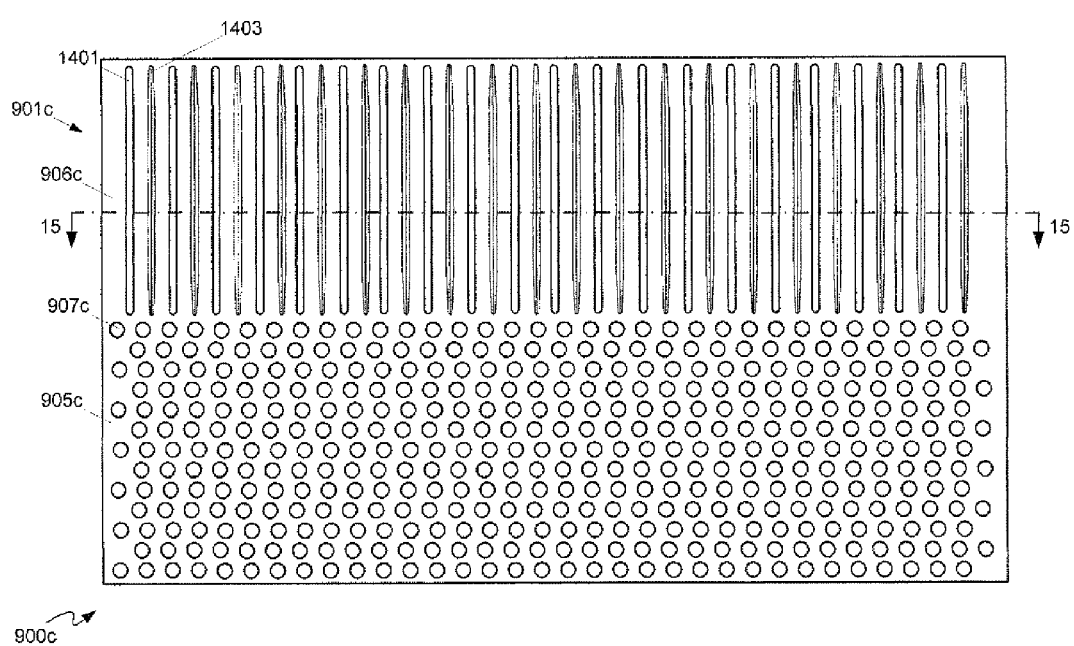
FIG. 14 depicts an apparatus for two stage cooling of ambient air that includes grooves and fins, according to non-limiting implementations.
Figure 15:
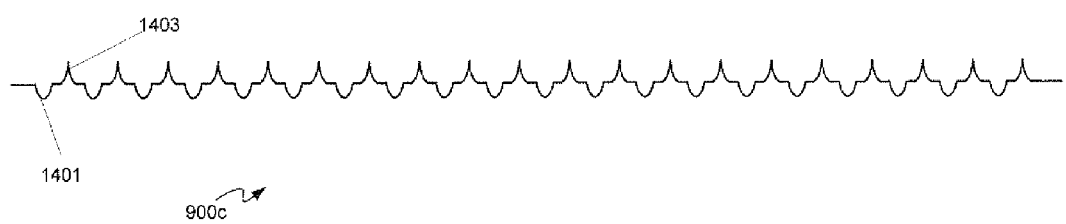
FIG. 15 depicts a cross-sectional view of the apparatus of FIG. 14 through line 15-15.

Returning briefly to FIGS. 9 to 11, heretofore upper portion 906 of radiating panel 901 has been depicted as generally smooth, however it is appreciated that upper portion 906 can be any suitable configuration. Furthermore upper portion 906 can be generally enabled to facilitate flow of ambient air 1101 towards the plurality of air openings 907 in lower portion 905. For example, upper portion 906 can be generally smooth to provide an unimpeded flow of ambient air 1101 towards the plurality of air openings 907 in lower portion 905. However. FIG. 14 depicts alternative implementations of an apparatus 900*c* for two stage cooling of ambient air. It is appreciated that apparatus 900*c* is substantially similar to apparatus 900, with like elements having like numbers however with a "c" appended thereto. It is furthermore appreciated that not all elements of apparatus 900*c* are numbered in FIG. 14 for clarity. In any event, upper portion 906*c* of apparatus 900*c* comprises at least one of grooves 1401 and fins 1403 to facilitate cooling of ambient air, wherein grooves 1401 and fins 1403 are generally oriented towards lower portion 905*c* and air openings 907*c*, and/or generally perpendicular to upper and lower edges of radiating panel 901*c*. A cross section of upper portion 906*c* through line 15-15 is depicted in FIG. 15 which in turn depicts cross sections of grooves 1401 and fins 1403. Each groove 1401 and each fin 1403 both increase the cooling surface area of upper portion 906*c* and further channel cooling ambient air towards lower portion 905*c* and air openings 907*c*. Any suitable number of grooves 1401 and any suitable number of fins 1403 arranged in any suitable pattern is within the scope of present implementations. Furthermore, while depicted implementations comprise alternating grooves 1401 and fins 1403, other implementations can comprise grooves 1401 without fins 1403 or fins 1403 without grooves 1403.

Attention is again briefly directed to FIG. 9. From FIG. 9, it is appreciated that lower portion 905 comprises a lower half of radiating panel 901, and hence air openings 907 are also located in a lower half of radiating panel 901. Furthermore, it is appreciated that air openings 907 are arranged in a semi-regular pattern. However, in other implementations, air openings 907 can be arranged in any suitable pattern or can be arranged randomly.

Figure 16:
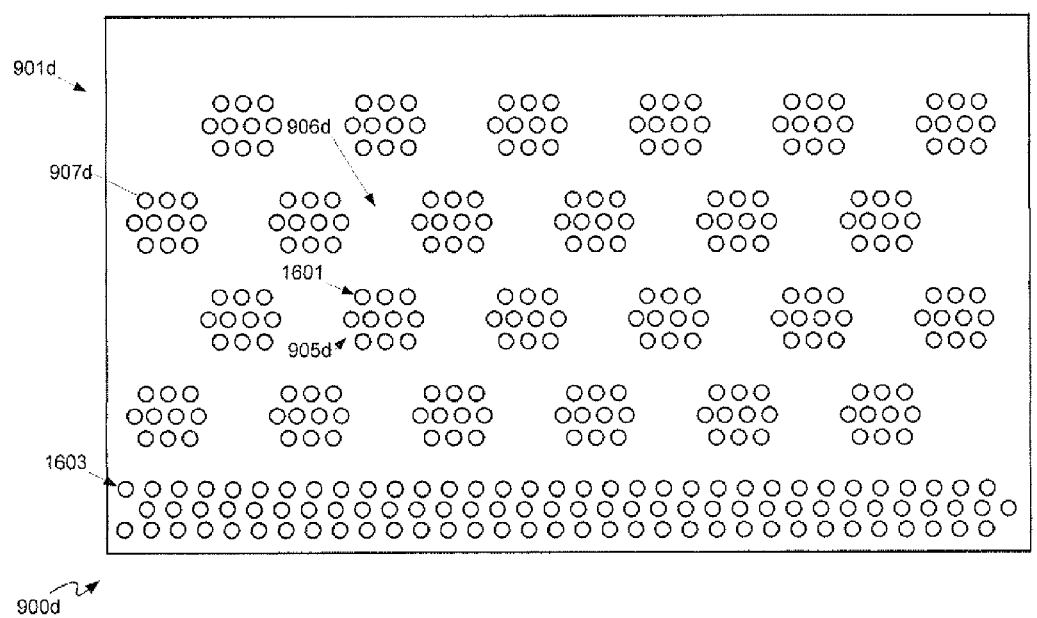
FIG. 16 depicts an apparatus for two stage cooling of ambient air with air openings arranged in groups, according to non-limiting implementations.

Attention is next directed to FIG. 16, which depicts an alternative implementation of an apparatus 900*d* for two stage cooling of ambient air. It is appreciated that apparatus 900*d* is substantially similar to apparatus 900, with like elements having like numbers however with a "d" appended thereto. It is furthermore appreciated that not all elements of apparatus 900*d* are numbered in FIG. 16 for clarity. In these implementations, the plurality of air openings 907*d* are arranged in groups in radiating panel 901*d* and the ambient air cooled by the radiating panel 901*d* above each respective group flows towards each respective group. An example group is labeled 1601 in FIG. 16 and is located just above the centre and towards a left side of radiating panel 901*d*. However, it is appreciated that other groups are located above, below and to the left and right of group 1601. Hence, in these implementations a respective upper portion 906*d* of radiating panel 901*d* is located above group 1601 and while group 1601 is located in a respective lower portion 905*d* of radiating panel 901*d*. Indeed, it is appreciated that, in these implementations, upper portion 906*d* is relative to lower portion 905*d*, and that each group is associated with a respective upper portion located above a respective group, and each group is similarly located in a respective lower portion relative to the respective upper portion. Hence, radiating panel 901*d* comprises a plurality of groups of air openings 907*d*, each group associated with a respective upper portion where first stage cooling of ambient air occurs. It is further appreciated that a group 1603 of air openings 907*d* is arranged along a bottom portion of radiating panel 901*d* to draw into an air collection space behind radiant panel 901*d* that is not drawn into the air collection space by other groups above group 1603.

It is further appreciated that the groups of air openings 907*d* can be arranged in one of a regular pattern, a random pattern or a semi-regular pattern in radiating panel 901.

Figure 17:
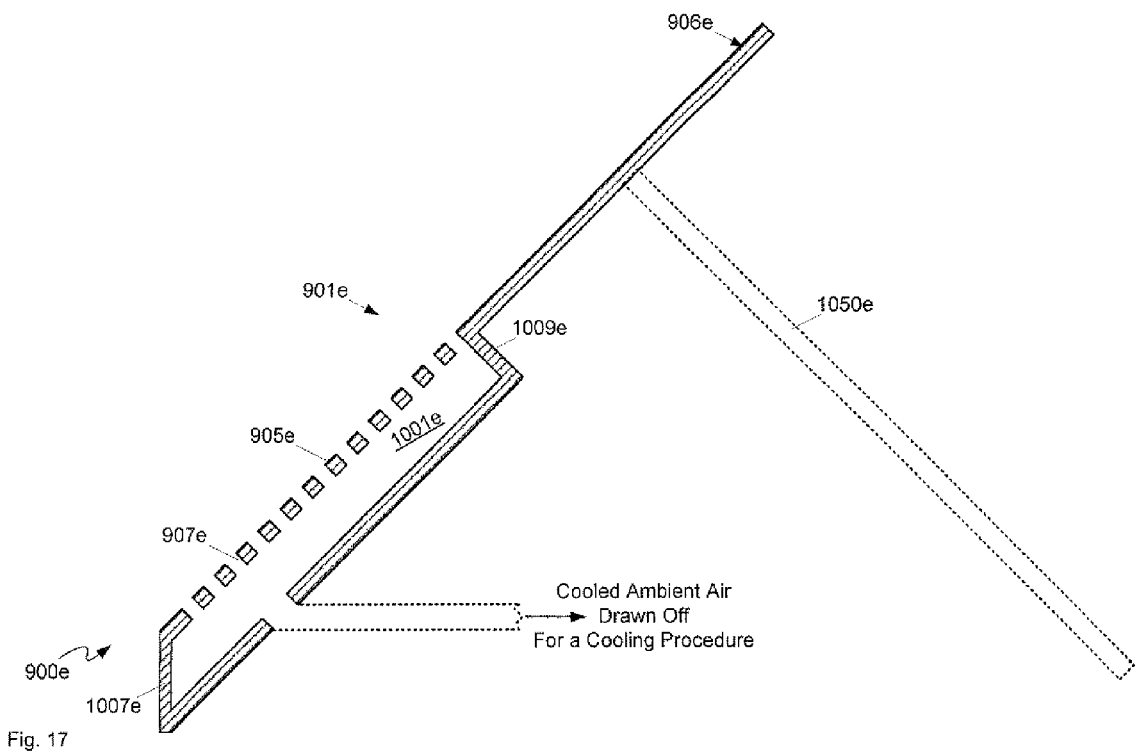
FIG. 17 depicts a cross-sectional view of an apparatus for two stage cooling of ambient air with an air collection space defined by a lower portion but not an upper portion, according to non-limiting implementations.

Attention is next directed to FIG. 17, which depicts an alternative implementation of an apparatus 900*e* for two stage cooling of ambient air. It is appreciated that apparatus 900*e* is substantially similar to apparatus 900, with like elements having like numbers however with an "e" appended thereto. It is furthermore appreciated that not all elements of apparatus 900*e* are numbered in FIG. 17 for clarity. In any event, air collection space 1001*e* is defined at least in part by lower portion 905*e* and not by upper portion 906*e*. In other words a size of air collection space 1001*e* is reduced relative to air collection space 1001. While in FIG. 17 air collection space 1001*e* is defined at least in part by lower portion 905*e*, as well as lower end section 1007*e* and upper end section 1009*e*, in other implementations, air collection space 1001*e* can be defined at least in part by by lower portion 905*e* and at least a section of upper portion 906*e*. In other words upper end section 1009*e* can extend from upper portion 906*e*, at least part way between lower portion 905*e* and an upper end of upper portion 906*e*.

Figure 22:
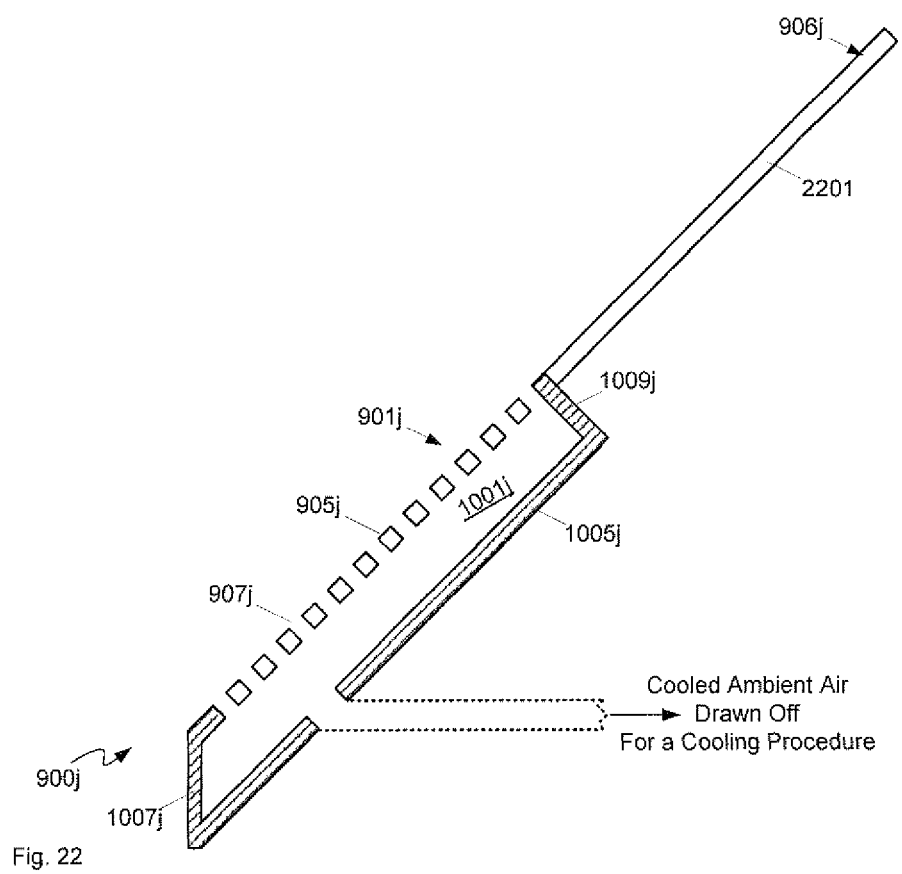
FIG. 22 depicts a cross-sectional view of an apparatus for two stage cooling of ambient air with at least a portion of air cooled by a sloped surface, according to non-limiting implementations.

In yet further implementations of apparatus 900*e*, upper portion 906*e* can be formed by a surface of a roof upon which apparatus 900*e* is mounted. In other words, in these implementations, the apparatus 900*e* ends at upper end section 1009*e*, and upper portion 906*e* is formed by the roof. For example, attention is next directed to FIG. 22, which depicts an alternative implementation of an apparatus 900*j* for two stage cooling of ambient air. It is appreciated that apparatus 900*j* is substantially similar to apparatus 900*e*, with like elements having like numbers however with a "j" appended thereto rather than an "e". It is furthermore appreciated that not all elements of apparatus 900j are numbered in FIG. 22 for clarity. Apparatus 900j comprises a radiating panel 901j with air openings 907j, with air collection space 1001j defined by radiating panel 901j, upper end section 1009j, a lower end section 1007j and a bottom panel 1005j. Alternatively, the back of air collection space 1005j could be defined by a roof as in apparatus 900a of FIG. 12.

In any event, apparatus 900j is mounted to a roof 2201 such that first stage cooling of air is performed by an upper section 906j of a sloped roof 2201 above apparatus 900j, similar to upper section 906 of FIGS. 9 and 10. Hence, in these implementations, apparatus 900j does not strictly comprise upper section 906j, but rather apparatus 900j is mounted to roof 900j in such a manner so as to collect air cooled by upper section 906j of roof 2201. In other words, roof 2201 is also subject to the above described night cooling effect and hence acts as a first stage night cooling apparatus such that cooled air flows down roof 2201 to be further cooled and collected by apparatus 900j. Hence, apparatus 900j, in combination with upper section 906j of roof 2201 form an apparatus with two stage night cooling as described above.

Further, it is appreciated that apparatus 900j comprises: a radiating panel 901j mountable to a sloped surface, such as sloped roof 2201, such that at least a portion of the sloped surface is above radiating panel 901j, and radiating panel 901j and the sloped surface are directed towards a night sky such that both radiating panel 901j and the sloped surface are cooled due to radiation heat loss from the radiating panel 901j and the sloped surface to the night sky, and air proximal to the radiating panel 901j and the sloped surface is cooled by transferring heat to the radiating panel 901j and the sloped surface which each radiate the heat via the radiation heat loss, and ambient air proximal to the sloped surface flows along the sloped surface towards the radiating panel 901j as the ambient air cools, the ambient air being further cooled due to further contact with the sloped surface and sloped roof 2201 as the ambient air flows towards the radiating panel 901j, wherein the radiating panel 901j is also sloped; a plurality of air openings 907j in the radiating panel 901j, for cooled ambient air to pass there through; and, an air collection space 1001j defined at least in part by the radiating panel 901j for receiving cooled ambient air passing through the plurality of air openings 907j, the air collection space 1001j connectable to a passageway for drawing the cooled ambient air for use in a cooling procedure.

In some implementations, apparatus 900j can be mounted on a lower section of roof 2201 below upper section 906j. Alternatively, apparatus 900j can be mounted to cantilever from roof 2201. Further, while in depicted implementations an upper end of apparatus 900j is flush with roof 2201, in other implementations, a step can occur between roof 2201 and apparatus 900j, with cooled air flowing down roof 2201 flowing over the step to be further cooled and collected by apparatus 900j.

Roofs of some homes could be 1000 square feet and roofs of industrial buildings can be hundreds of thousands of square feet. On buildings with larger sloped roofs (e.g. industrial buildings), a substantial portion of the sloped roof 2201 can be covered with one or more of apparatus 900j, with one or more apparatus 900j being arranged on roof 2201 such that apparatus 900j is longer in a horizontal direction and shorter in a vertical direction. Hence, existing roofs can be adapted for night cooling such that apparatus 900j could be mounted on an existing roof, for example at a slight angle to the existing roof and not have upper end section 1009j.

For example, attention is next directed to FIG. 24, which depicts an alternative implementation of an apparatus 900L for two stage cooling of ambient air. It is appreciated that apparatus 900L is substantially similar to apparatus 900j, with like elements having like numbers however with an "L" appended thereto rather than a "j", it is furthermore appreciated that not all elements of apparatus 900L are numbered in FIG. 24 for clarity. Apparatus 900L comprises a radiating panel 901L mounted on a sloped surface 2401, for example a sloped roof, upper section 906L of sloped surface 2401 acting as a first stage radiating panel as described above with reference to upper section 906j in FIG. 22.

Air collection space 1001L is defined by radiating panel 901L, a lower end section 1007L and sloped surface 2401. However, radiating panel 901L is itself sloped such that at a top edge 2403 is enabled to rest on sloped surface 2401 such that ambient air cooled by sloped surface 2401 flows onto radiating panel 901L. Further, air collection space 1001L becomes narrower from lower end section 1007L to upper edge 2403. It is appreciated that apparatus 900L is hence L-shaped in cross section, such that air collection 1001L is triangular in cross-section when apparatus 900L is mounted on sloped surface 2401. It is further appreciated that apparatus 900L is lacking an upper end section similar to upper end sections 1009, 1009j and the like. Hence, apparatus 900L comprises less material than a similar apparatus with an upper end section.

Furthermore, in depicted implementations, top edge 2403 is beveled thereby minimizing the step between radiating panel 90L and sloped surface 2401. However, in other implementations top edge 2403 need not be beveled; indeed, the thickness of radiating panel 901L can range from approximately a few millimeters to approximately 1 centimeter (as can all radiating panels 900-900L described herein); while this thickness will create a slight step between radiating panel 901L and the step does not substantially interfere with flow of cooled ambient air from upper section 906L to radiating panel 901L. With further reference to FIG. 17, in some implementations, at least a portion of upper portion 906e and/or upper portion 906j can comprise glass, glazing, skylights and the like in a roof upon which apparatus 900e and/or apparatus 900j is mounted (also see FIG. 19 described below).

Figure 18:
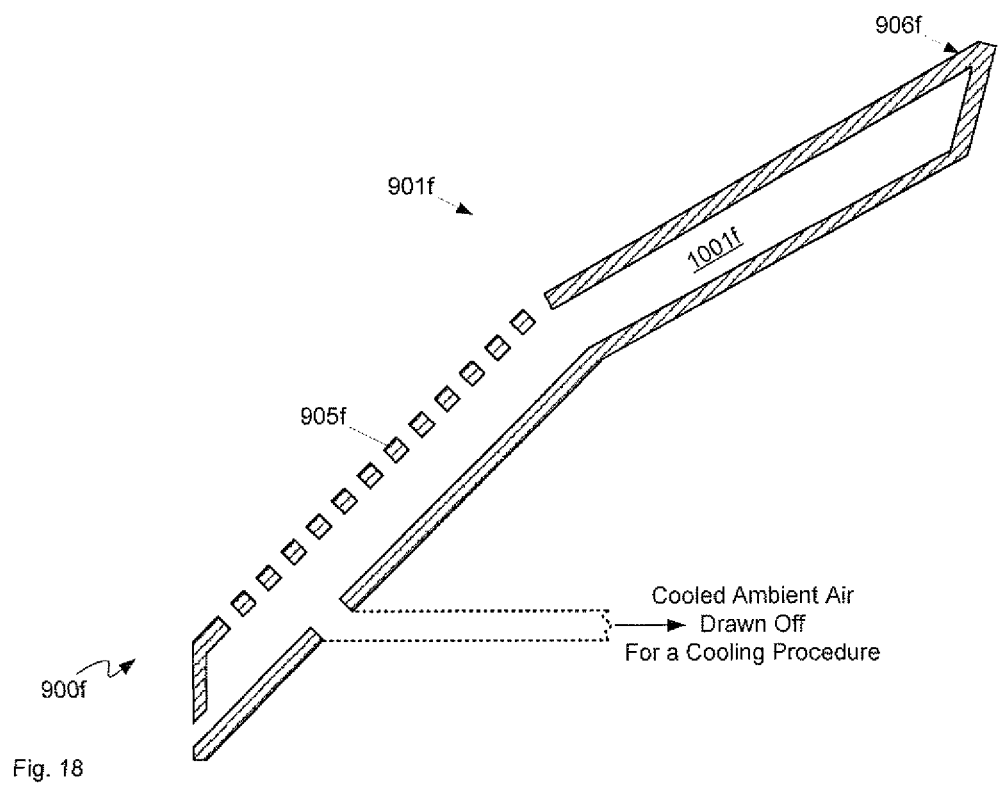
FIG. 18 depicts a cross-sectional view of an apparatus for two stage cooling of ambient air with an lower portion and an upper portion at different slopes, according to non-limiting implementations.

Attention is next directed to FIG. 18, which depicts an alternative implementation of an apparatus 900f for two stage cooling of ambient air. It is appreciated that apparatus 900f is substantially similar to apparatus 900, with like elements having like numbers however with an "f" appended thereto. It is furthermore appreciated that not all elements of apparatus 900f are numbered in FIG. 18 for clarity. In any event, in these implementations, upper portion 906f is at one of a steeper slope or a shallower slope than lower portion 905f. As depicted, upper portion 906f is at a shallower slope than lower portion 905f. In other words, aside from increasing or decreasing convective flow of air along upper portion 906f, as compared to upper portion 906, apparatus 900f can be enabled for mounting onto a roof with varying angles, such that upper portion 906f is mounted on a first portion of a roof at a first angle and lower portion is mounted on a second portion of the roof at second angle. Furthermore, aspects of apparatus 900f can be combined with aspects of apparatus 900e, in that upper portion 906f can be formed by a first section of the roof, with air collection space only under lower portion 905f, which is mounted on a portion of the roof that is at a different angle from upper portion 906f. Hence, the roof could be non perforated and perforated lower portion 900f could be mounted at an eve or a mansard of the roof.

Figure 19:
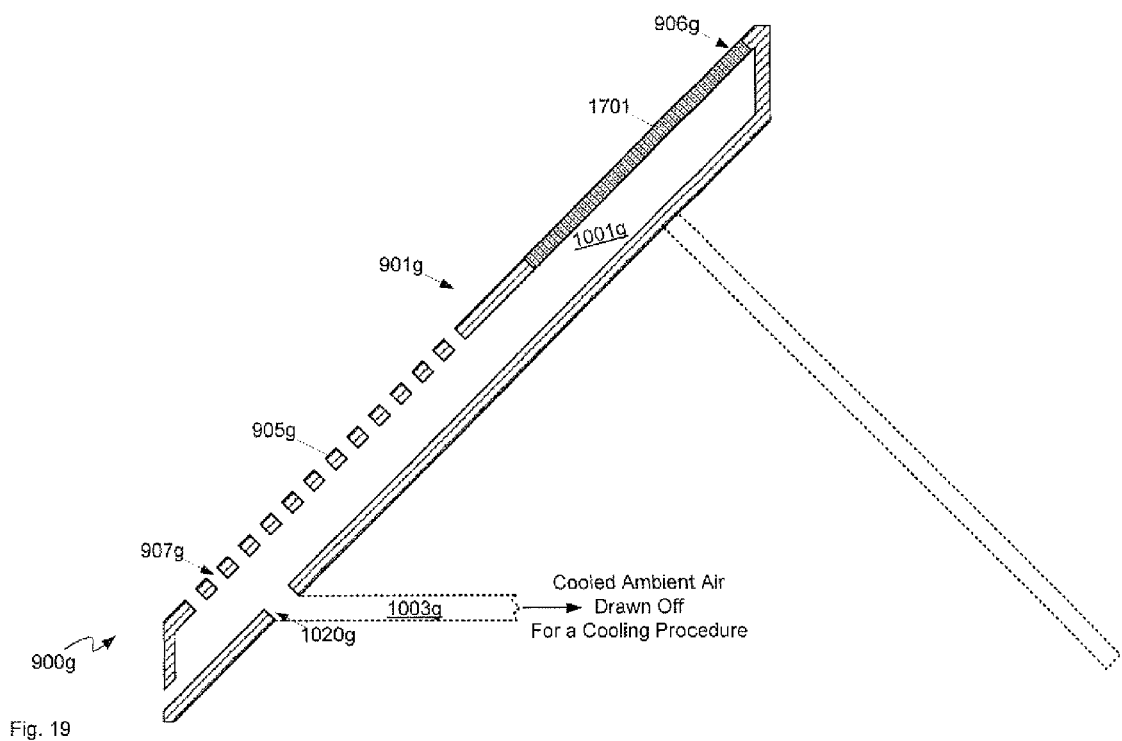
FIG. 19 depicts a cross-sectional view of an apparatus for two stage cooling of ambient air with at least a portion of an upper section being transparent, according to non-limiting implementations.

Attention is next directed to FIG. 19, which depicts an alternative implementation of an apparatus 900f for two stage cooling of ambient air. It is appreciated that apparatus 900f is substantially similar to apparatus 900, with like elements having like numbers however with an "f" appended thereto. It is furthermore appreciated that not all elements of apparatus 900f are numbered in FIG. 18 for clarity. In any event, in these implementations, at least a section 1701 of upper portion 906f of radiating panel 901g is transparent or semi-transparent, while the remaining section of upper portion 906f is opaque as is lower portion 905f, other than air opening 907g. It is further appreciated that while section 1701 is depicted in cross-section, section 1701 does not necessarily extend the horizontal length of radiating panel 901g. Further, as section 1701 is transparent or semi-transparent, during the daytime, solar heating of air in air collection space 1001g will occur, and the heated air can be drawn through aperture 1030g into passageway 1003g for use in a heating procedure, such as heating air in an HVAC system. Alternatively, when air collection space 1001g is defined by lower portion 905g, as in apparatus 900e of FIG. 17, section 1701 can comprise glass glazing, skylights and the like in a roof upon which device 900g is mounted. Testing of a successful prototype has shown that glazing behaves similar to metal with regard to the above described night cooling effect.

Figure 20:
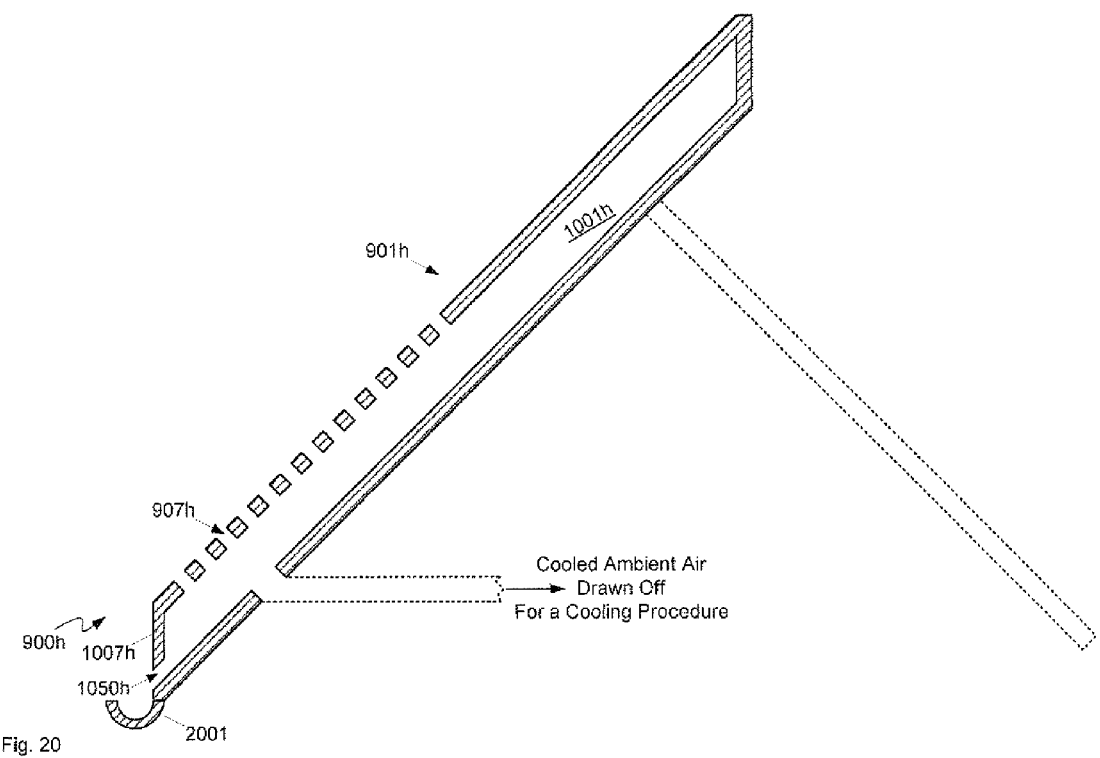
FIG. 20 depicts a cross-sectional view of an apparatus for two stage cooling of ambient air including a trough for collecting moisture, according to non-limiting implementations.

Attention is next directed to FIG. 20, which depicts an alternative implementation of an apparatus 900h for two stage cooling of ambient air. It is appreciated that apparatus 900h is substantially similar to apparatus 900, with like elements having like numbers however with an "h" appended thereto. It is furthermore appreciated that not all elements of apparatus 900h are numbered in FIG. 20 for clarity. In any event, in these implementations, a moisture collection trough 2001 located along a lower edge of apparatus 900e, for example at a lower edge of lower section 1007h. Hence, when air is cooled such that air reaches a dew point and moisture condenses on the surface of radiating panel 901h, such moisture will run down radiating panel 901e as it is sloped. The moisture can be collected using trough 2001, and the moisture can in turn be collected from trough 2001. This can be desirable in desert climates where larger amounts of cooling are possible and where lack of rain exists.

In some implementations, trough 2001 is itself sloped such that moisture collected therein will run to a collection tank or the like.

It is further appreciated that in depicted implementations, trough is located to further collect moisture from air collection space 1001h via optional aperture 1050h (i.e. trough 2001 is located below aperture 1050h). In implementations where optional aperture 1050h is not present, trough 2001 can be located at an upper edge of lower section 1007h, or indeed at any location along lower section 1007h.

Figure 21:
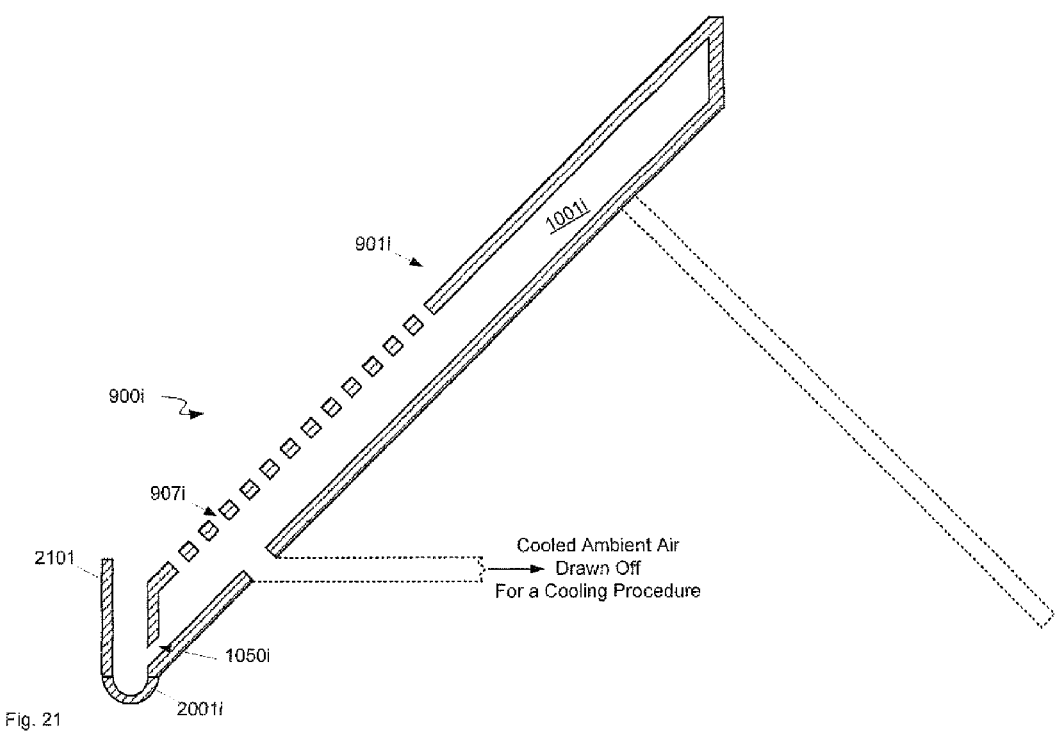
FIG. 21 depicts a cross-sectional view of an apparatus for two stage cooling of ambient air including a raised trough for collecting moisture and acting as a stop for cooled air, according to non-limiting implementations.

Attention is next directed to FIG. 21, which depicts an alternative implementation of an apparatus 900i for two stage cooling of ambient air. It is appreciated that apparatus 900i is substantially similar to apparatus 900h, with like elements having like numbers however with an "i" appended thereto rather than an "h". It is furthermore appreciated that not all elements of apparatus 900i are numbered in FIG. 21 for clarity. In any event, in these implementations, a front side 2101 of moisture collection trough 2001i is raised such that it is higher than a bottom end of radiating panel 901i so as to create a stop for any cool air that is not collected by air openings 907i. Such cooled air can collect in trough 2001i and can be drawn into air collection space 1001i via aperture 1050i and/or such cooled air can overflow trough 2001i to be further drawn into air openings 907i toward the lower end of radiating panel 901i.

In any event, the various implementations for two stage cooling of ambient air using the night cooling effect described herein can save significant cost and resources at night when cooled air is needed for any suitable cooling process.

Still other modifications and variations to the embodiments described herein may occur to those skilled in the art. All such modifications and variations are believed to be within the sphere and scope of the present invention.

What is claimed is:

1. An apparatus comprising:
a radiating panel mountable to one or more of a surface and a building such that the radiating panel is directed towards a night sky and cooled due to radiation heat loss from the radiating panel to the night sky, and air proximal to the radiating panel is cooled by transferring heat to the radiating panel which radiates the heat via the radiation heat loss, the radiating panel being sloped such that ambient air proximal a non-perforated upper portion of an outer surface of the radiating panel flows along the non-perforated upper portion of the outer surface towards a lower portion of the outer surface of the radiating panel as the ambient air cools, the ambient air being further cooled due to further contact with the radiating panel as the ambient air flows towards the lower portion;
a plurality of air openings in the lower portion of the outer surface of the radiating panel, for the ambient air cooled by the radiating panel to pass there through as the ambient air flows along the outer surface; and,
an air collection space defined at least in part by the radiating panel for receiving cooled ambient air passing through the plurality of air openings, the air collection space connectable to a passageway for drawing the cooled ambient air for use in a cooling procedure.

2. The apparatus of claim 1, wherein the air collection space is disposed between the radiating panel and one or more of the surface and the building.

3. The apparatus of claim 1, further comprising a bottom panel wherein the air collection space is disposed between the radiating panel and the bottom panel.

4. The apparatus of claim 1, wherein the air collection space is defined by the lower portion but not the non-perforated upper portion of the radiating panel.

5. The apparatus of claim 1, wherein the radiating panel comprises at least one of overlapping radiating panels and adjacent radiating panels.

6. The apparatus of claim 5, wherein the plurality of air openings comprise at least one of slits, holes, and gaps between at least one of the overlapping radiating panels and the adjacent radiating panels.

7. The apparatus of claim 1, wherein the radiating panel is corrugated.

8. The apparatus of claim 1, wherein the non-perforated upper portion of the radiating panel is enabled to facilitate flow of the ambient air towards the plurality of air openings in the lower portion.

9. The apparatus of claim 8, wherein the non-perforated upper portion is generally smooth.

10. The apparatus of claim 8, wherein the non-perforated upper portion comprise at least one of grooves and fins to facilitate cooling of the ambient air.

11. The apparatus of claim 1, wherein the lower portion comprises a lower half of the radiating panel.

12. The apparatus of claim 1, wherein at least a section of the non-perforated upper portion of the radiating panel comprises one or more of the surface and the building when the apparatus is mounted thereto.

13. The apparatus of claim 1, wherein the plurality of air openings are arranged in groups in the radiating panel and the ambient air cooled by the radiating panel above each respective group flows towards each respective group.

14. The apparatus of claim 13, wherein the groups are arranged in one of a regular pattern or a random pattern in the radiating panel.

15. The apparatus of claim 1, wherein the air collection space is connectable to the passageway at a lower portion of the air collection space.

16. The apparatus of claim 1, wherein the air collection space is connectable to the passageway between a lower end and a midpoint of the air collection space.

17. The apparatus of claim 1, wherein the section of radiating panel above the passageway is free of the air openings, thereby shielding the passageway from moisture coming through the air openings.

18. The apparatus of claim 1, wherein the air collection space is connectable to the passageway along a side of the apparatus.

19. The apparatus of claim 1, wherein a slope of the radiating panel is in a range of approximately less than 5° to approximately more than 80°.

20. The apparatus of claim 1, further comprising a mounting device to mount the radiating panel to at least one of the surface and the building.

21. The apparatus of claim 1, further comprising a supporting device for supporting the radiating panel on at least one of the surface and the building.

22. The apparatus of claim 1, wherein at least a section of the non-perforated upper portion of the radiating panel is at least partially transparent and the lower portion is opaque.

23. The apparatus of claim 1, further comprising a drain at a lower end of the apparatus such that moisture that collects inside the radiating panel can drain.

24. The apparatus of claim 1, wherein a slope of the non-perforated upper portion of the radiating panel is different from a slope of the lower portion.

* * * * *